United States Patent
Zhu et al.

(10) Patent No.: US 12,335,034 B2
(45) Date of Patent: Jun. 17, 2025

(54) CODING METHOD AND APPARATUS

(71) Applicant: HUAWEI TECHNOLOGIES CO., LTD., Guangdong (CN)

(72) Inventors: Huiying Zhu, Shanghai (CN); Pengpeng Dong, Shanghai (CN); Zhiyuan Tan, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 238 days.

(21) Appl. No.: 18/146,531

(22) Filed: Dec. 27, 2022

(65) Prior Publication Data

US 2023/0139754 A1 May 4, 2023

Related U.S. Application Data

(63) Continuation of application No. PCT/CN2021/092399, filed on May 8, 2021.

(30) Foreign Application Priority Data

Jun. 30, 2020 (CN) .......................... 202010617936.4

(51) Int. Cl.
*H04L 1/00* (2006.01)
*H04L 1/18* (2023.01)
*H04W 28/04* (2009.01)

(52) U.S. Cl.
CPC .......... *H04L 1/0006* (2013.01); *H04L 1/0002* (2013.01); *H04L 1/18* (2013.01); *H04W 28/04* (2013.01)

(58) Field of Classification Search
None
See application file for complete search history.

(56) References Cited

U.S. PATENT DOCUMENTS

| 2019/0165813 A1* | 5/2019 | Liu ........................ H04L 1/0057 |
| 2021/0306988 A1* | 9/2021 | Wang .................... H04L 1/0008 |

FOREIGN PATENT DOCUMENTS

| CN | 107342773 A | 11/2017 |
| CN | 108400838 A | 8/2018 |
| TW | 201941555 A | 10/2019 |
| WO | 2019160863 A1 | 8/2019 |
| WO | 2020084524 A1 | 4/2020 |

OTHER PUBLICATIONS

Huawei et al., "Scheduling of multiple transport blocks", 3GPP TSG RAN WG1 Meeting #96bis R1-1903917, Apr. 12, 2019, total 7 pages.
3GPP TSG RAN Meeting #86, RP-192535, Use cases and options for network coding in IAB, Intel Corporation, ATandT, Sitges, Spain, Dec. 9-12, 2019, total 14 pages.
"3rd Generation Partnership Project; Technical Specification Group Radio Access Network; NR; Multiplexing and channel coding (Release 15)", 3GPP Draft; 38212-FSO, Jan. 11, 2020, XP052300280, total 101 pages.

* cited by examiner

*Primary Examiner* — The H Y Nguyen

(57) ABSTRACT

Coding method and apparatus provide for coding a to-be-coded data unit to obtain a coded data unit, where a size of the to-be-coded data unit is related to a size of a first data unit. The first data unit is a transport block TB, a protocol data unit PDU, or a service data unit SDU. The first data unit is generated based on the coded data unit.

17 Claims, 15 Drawing Sheets

CODING METHOD AND APPARATUS

CROSS-REFERENCE TO RELATED APPLICATIONS

This application is a continuation of International Application No. PCT/CN2021/092399, filed on May 8, 2021, which claims priority to Chinese Patent Application No. 202010617936.4, filed on Jun. 30, 2020. The disclosures of the aforementioned applications are hereby incorporated by reference in their entireties.

TECHNICAL FIELD

Embodiments of this disclosure relate to the field of communication technologies, and in particular, to a coding method and an apparatus.

BACKGROUND

Compared with the fourth generation mobile communication system, the fifth generation mobile communication system has stricter requirements on network performance indicators. For example, the fifth generation mobile communication system has higher requirements on service transmission reliability.

To improve transmission quality of a radio link, an air interface transmission rate control technology, such as an adaptive modulation and coding (AMC) technology, is used to adjust a modulation scheme and a coding rate for radio link transmission. A transmitting end selects, in a scheduling period, transmission time interval, or transmission opportunity (it may be understood that one transmission opportunity corresponds to one times of scheduling), a proper modulation and coding scheme (MCS) based on channel state information (CSI) fed back by a receiving end. When channel quality is good, the MCS is enhanced by using an AMC algorithm. When the channel quality is poor, the MCS is lowered by using the AMC algorithm. A size of a transport block (TB) is calculated based on the adjusted MCS and a size of a physical resource. That is, the size of the TB transmitted at different transmission opportunities changes dynamically.

The size of the TB is adaptively adjusted based on the size of the physical resource and channel state information. As a result, the size of the TB varies depending on transmission opportunities. Therefore, when a coded data unit generated according to a network coding scheme is transmitted via a TB, a size of the coded data unit may not match the size of the TB, resulting in a decrease in system spectral efficiency.

SUMMARY

Embodiments of this disclosure provide a coding method and an apparatus, to improve system spectral efficiency.

According to a first aspect, this disclosure provides a coding method that may be performed by a first coding apparatus. The first coding apparatus may be a communication device or a coding apparatus such as a chip that supports the communication device in implementing functions used in the method. For example, the first coding apparatus may be a network device, a chip disposed in the network device and configured to implement functions of the network device, or another component configured to implement functions of the network device. Alternatively, the first coding apparatus may be a terminal device, or a chip that is disposed in the terminal device and that is configured to implement functions of the terminal device, or another component configured to implement functions of the terminal device.

A size of a to-be-coded data unit is determined based on a size of a first data unit. Therefore, the to-be-coded data unit is related to the size of the first data unit, and the to-be-coded data unit is coded to obtain a coded data unit. The first data unit is generated based on the coded data unit. Finally, the first data unit is output. The first data unit may be a TB, a protocol data unit (protocol data unit, PDU), or a service data unit (service data unit, SDU).

In this embodiment, the size of the to-be-coded data unit is determined based on the size of the first data unit. Therefore, the size of the to-be-coded data unit is related to the size of the first data unit, and the coded data unit generated based on the to-be-coded data unit matches the size of the output first data unit. This implements that a size of a data unit transmitted in a current transmission opportunity can match a size of a TB in the current transmission opportunity, thereby improving system spectral efficiency.

In a possible implementation, the size of the to-be-coded data unit is further related to a quantity of to-be-coded data units.

In this implementation, the first coding apparatus may determine the size of the to-be-coded data unit based on the quantity of to-be-coded data units and the size of the first data unit. Therefore, the quantity of to-be-coded data units meets a current transmission requirement while the coded data unit generated based on the to-be-coded data unit matches the size of the first data unit. This improves coding gains, and further improves system's spectrum resource utilization.

In another possible implementation, the size of the to-be-coded data unit is further related to a quantity of coded data units.

According to the foregoing method, the first coding apparatus may determine the size of the coded data unit based on the quantity of coded data units and the size of the first data unit, and further determine the size of the to-be-coded data unit. Therefore, the quantity of coded data units that are in the output first data unit and that can be transmitted meets a current transmission requirement while the coded data unit generated based on the to-be-coded data unit matches the size of the first data unit. This further improves system's spectrum resource utilization.

In a possible implementation, the size of the to-be-coded data unit is further related to a header size of the coded data unit.

According to the foregoing method, the following scenario is considered: Corresponding header information is added to the coded data unit in a process of generating the first data unit. Therefore, the size of the to-be-coded data unit may be determined based on the header size of the coded data unit, the quantity of to-be-coded data units, and the size of the first data unit. This allows the first coding apparatus to, based on a case that the determined size of the to-be-coded data unit may match a size of a coded data unit with no header added, the scenario in which the header information is added to the coded data unit.

In a possible implementation, the size of the to-be-coded data unit satisfies:

$$\left\lceil \frac{S1}{\frac{M}{R}} \right\rceil - H, \text{ or } \left\lfloor \frac{S1}{M/R} \right\rfloor - H$$

S1 represents the size of the first data unit, M represents the quantity of to-be-coded data units, R represents a first coding bit rate, H represents the header size of the coded data unit, $\lfloor \cdot \rfloor$ represents rounding down, and $\lceil \cdot \rceil$ represents rounding up.

According to the foregoing method, the size of the to-be-coded data unit is determined based on the header size of the coded data unit, the quantity of to-be-coded data units, the first coding bit rate, and the size of the first data unit. In the method, the quantity of coded data units is determined based on the first coding bit rate and the quantity of to-be-coded data units. Further, the size of the coded data unit is determined by rounding up or rounding down a division result obtained by dividing the size of the first data unit by the quantity of coded data units. The header size of the coded data unit is further considered, to determine the size of the to-be-coded data unit. A correlation between the size of the first data unit and the quantity of coded data units is determined in the division manner. This simplifies a manner of determining the to-be-coded data unit and improves coding efficiency.

In a possible implementation, a second data unit is obtained; and the to-be-coded data unit is generated based on the size of the to-be-coded data unit and the second data unit.

The second data unit is by the first coding apparatus. The second data unit may be data that needs to be output by the first coding apparatus. Therefore, the first coding apparatus may use the data in the second data unit as data in the to-be-coded data unit, and generate the to-be-coded data unit based on the determined size of the to-be-coded data unit and the data in the second data unit. In this way, the data of the second data unit is output as the first data unit, so that transmission performance of transmitting the data in the second data unit by the first coding apparatus is improved.

In a possible implementation, the size of the to-be-coded data unit is greater than a total size of M0 second data units; and the size of the to-be-coded data unit is less than a total size of M0+1 second data units, where M0 is a positive integer.

According to the foregoing method, a total size of the second data unit and the padding information matches the size of the to-be-coded data unit by adding padding information. This reduces complexity of determining the to-be-coded data unit based on the second data unit and the size of the to-be-coded data unit.

In a possible implementation, the size of the to-be-coded data unit is less than a total size of M_0 second data units. The size of the to-be-coded data unit is greater than a total size of M_0−1 second data units, where M_0 is a positive integer.

According to the foregoing method, the second data unit may be segmented, so that a size of a second data unit obtained through segmentation matches the size of the to-be-coded data unit. This reduces complexity of determining the to-be-coded data unit based on the second data unit and the size of the to-be-coded data unit.

In a possible implementation, first indication information is received, where the first indication information indicates the size of the first data unit.

The first coding apparatus receives the first indication information so that the first coding apparatus can determine a size of a to-be-transmitted data unit (for example, the to-be-coded data unit or the coded data unit) based on the size of the first data unit. Therefore, when the first coding apparatus cannot determine the size of the first data unit, the coded data unit can still match the size of the output first data unit. In this way, the first coding apparatus can be applied to more scenarios, improving applicability of the first coding apparatus.

In a possible implementation, second indication information is sent. The second indication information indicates the quantity of coded data units, or indicates the quantity of to-be-coded data units and the first coding bit rate, or indicates the size of the to-be-coded data unit or the size of the coded data unit.

The second indication information is sent by the first coding apparatus. Accordingly, a decoder side receives the second indication information, and then decodes, based on the second indication information, the first data unit output by the first coding apparatus, to correctly receive the data in the second data unit.

In a possible implementation, the to-be-coded data unit includes a to-be-coded newly transmitted data unit, and the coded data unit includes a coded newly transmitted data unit. The to-be-coded newly transmitted data unit is coded to obtain the coded newly transmitted data unit. A size of the to-be-coded newly transmitted data unit is related to a size of a first retransmitted data unit.

According to the foregoing method, the following scenario is considered: When a retransmitted data unit (for example, the first retransmitted data unit) needs to be transmitted in a transmission opportunity (TXOP), the size of the to-be-coded newly transmitted data unit may be determined based on the size of the first retransmitted data unit and the size of the first data unit, then the to-be-coded newly transmitted data unit may be generated based on the size of the to-be-coded newly transmitted data unit, and a coded newly transmitted data unit is correspondingly generated. In this way, a total size of the coded newly transmitted data unit and the first retransmitted data unit that are transmitted in the current transmission opportunity matches the size of the first data unit. This improves system spectral efficiency in a scenario in which the first retransmitted data unit and the coded newly transmitted data unit are output simultaneously.

In a possible implementation, the size of the to-be-coded newly transmitted data unit is further related to a quantity of to-be-coded newly transmitted data units.

According to the foregoing method, the following scenario is considered: When a retransmitted data unit (for example, the first retransmitted data unit) that needs to be transmitted in a transmission opportunity, the quantity of to-be-coded data units meets a current transmission requirement while the total size of the coded newly transmitted data unit and the first retransmitted data unit matches the size of the first data unit. This improves coding gains, and further improves system's spectrum resource utilization.

In a possible implementation, the size of the to-be-coded newly transmitted data unit is further related to a quantity of coded newly transmitted data units.

According to the foregoing method, a size of the coded newly transmitted data unit may be determined based on the size of the first retransmitted data unit, the size of the first data unit, and the quantity of coded newly transmitted data units. Therefore, a quantity of coded newly transmitted data units that are in the first data unit and that can be transmitted meets a current transmission requirement while the total size of the coded newly transmitted data unit and the first retransmitted data units matches the size of the first data unit. This further improves system's spectrum resource utilization.

In a possible implementation, the size of the to-be-coded newly transmitted data unit is further related to a header size of the coded newly transmitted data unit.

According to the foregoing method, the following scenario is considered: The coded newly transmitted data unit further includes corresponding header information. Therefore, the size of the to-be-coded newly transmitted data unit may be determined based on the header size of the coded newly transmitted data unit, the quantity of to-be-coded newly transmitted data units, the size of the first retransmitted data unit, and the size of the first data unit. This allows the first coding apparatus to adapt to, based on a case that the determined size of the to-be-coded newly transmitted data unit may match a size of a coded newly transmitted data unit with no header added, the scenario in which the header information is added to the coded newly transmitted data unit.

In a possible implementation, the size of the to-be-coded newly transmitted data unit satisfies:

$$\left\lceil \frac{S1-S2}{M1/R1} \right\rceil - H1, \text{ or } \left\lfloor \frac{S1-S2}{M1/R1} \right\rfloor - H1$$

S1 represents the size of the first data unit, S2 represents the size of the first retransmitted data unit, M1 represents the quantity of to-be-coded newly transmitted data units, H1 represents the header size of the coded newly transmitted data unit, R1 represents a second coding bit rate, $\lfloor \cdot \rfloor$ represents rounding down, and $\lceil \cdot \rceil$ represents rounding up.

According to the foregoing method, the size of the to-be-coded newly transmitted data unit is determined based on the header size of the coded newly transmitted data unit, the quantity of to-be-coded newly transmitted data units, the second coding bit rate, and the size of the first data unit. In the method, a quantity M1/R1 of coded newly transmitted data units is determined based on the second coding bit rate R1 and the quantity M1 of to-be-coded newly transmitted data units. Further, the size of the coded data unit is determined as follows: subtracting the size S2 of the first retransmitted data unit from the size S1 of the first data unit as an available size of all coded newly transmitted data units in a current transmission opportunity, dividing the available size by the quantity M1/R1 of coded newly transmitted data units, and then rounding up or down the division result. The header size of the coded data unit is further considered, to determine the size of the to-be-coded data unit. A correlation between the available size (S1-S2) of all coded newly transmitted data units in the current transmission opportunity and the quantity M1/R1 of coded newly transmitted data units is determined in the division manner. This simplifies a manner of determining the to-be-coded data unit and improves coding efficiency.

In a possible implementation, a fourth data unit is obtained, and the to-be-coded newly transmitted data unit is determined based on the size of the to-be-coded newly transmitted data unit and the fourth data unit.

The fourth data unit is obtained by the first coding apparatus. The fourth data unit may be newly transmitted data that needs to be output by the first coding apparatus. Therefore, the first coding apparatus may use data in the fourth data unit as data in the to-be-coded newly transmitted data unit, and generate the to-be-coded newly transmitted data unit based on the determined size of the to-be-coded newly transmitted data unit and the data in the fourth data unit. Newly transmitted data in the first data unit generated by the first coding apparatus by using the foregoing method is the data in the fourth data unit, and retransmitted data in the first data unit is data in the first retransmitted data unit. Therefore, the newly transmitted data in the fourth data unit and the first retransmitted data are output together as the first data unit. This improves performance of transmitting the newly transmitted data in the fourth data unit and the first retransmitted data unit by the first coding apparatus.

In a possible implementation, the to-be-coded newly transmitted data unit satisfies at least one of the following:
the size of the to-be-coded newly transmitted data unit satisfies a first condition, and the quantity of to-be-coded newly transmitted data units satisfies a second condition.

The first condition is that the size of the to-be-coded newly transmitted data unit is less than or equal to a first threshold; or the first condition is that the size of the to-be-coded newly transmitted data unit falls within a first value range.

The second condition is that the quantity of to-be-coded newly transmitted data units is less than or equal to a second threshold; or the second condition is that the quantity of to-be-coded newly transmitted data units falls within a second value range.

According to the foregoing method, sizes and/or the quantity of to-be-coded newly transmitted data units may be determined based on the first condition, the second condition, and other conditions (for example, the size of the to-be-coded newly transmitted data unit is further related to the size of the first retransmitted data unit and the size of the first data unit in the foregoing embodiment) that need to be satisfied by the to-be-coded newly transmitted data unit, so that the generated to-be-coded newly transmitted data unit better satisfies a transmission requirement of the coding apparatus, improving data transmission performance.

In a possible implementation, the coded newly transmitted data unit satisfies at least one of the following:
the size of the coded newly transmitted data unit satisfies a third condition, and the quantity of coded newly transmitted data units satisfies a fourth condition.

The third condition is that the size of the coded newly transmitted data unit is less than or equal to a third threshold; or the third condition is that the size of the coded newly transmitted data unit falls within a third value range.

The fourth condition is that the quantity of coded newly transmitted data units is less than or equal to a fourth threshold; or the fourth condition is that the quantity of coded newly transmitted data units falls within a fourth value range.

According to the foregoing method, sizes and/or the quantity of coded newly transmitted data units may be determined based on the third condition, the fourth condition, and other conditions that need to be satisfied by the coded newly transmitted data units, so that the generated coded newly transmitted data unit better satisfies the transmission requirement of the coding apparatus, improving data transmission performance.

In a possible implementation, the to-be-coded data unit further includes a to-be-coded retransmitted data unit, and the coded data unit further includes a coded retransmitted data unit. The to-be-coded retransmitted data unit is coded to obtain the coded retransmitted data unit. A size of the to-be-coded retransmitted data unit is related to the size of the to-be-coded newly transmitted data unit.

In another possible implementation, the to-be-coded newly transmitted data unit and the to-be-coded retransmitted data unit are coded, to obtain a coded newly transmitted data unit and a coded retransmitted data unit.

According to the foregoing method, the to-be-coded retransmitted data unit and the to-be-coded newly transmitted data unit may be jointly coded, to generate the coded newly transmitted data unit and the coded retransmitted data unit. This improves coding efficiency and coding performance.

In a possible implementation, the to-be-coded data unit further includes a to-be-coded retransmitted data unit, and the coded data unit further includes a coded retransmitted data unit. The to-be-coded retransmitted data unit is coded to obtain a second retransmitted data unit. The coded retransmitted data unit is generated based on the size of the to-be-coded newly transmitted data unit and the second retransmitted data unit.

According to the foregoing method, the generated second retransmitted data unit may be used as the to-be-coded retransmitted data unit, and the size of the to-be-coded newly transmitted data unit is used as the size of the to-be-coded retransmitted data unit, so that the generated coded retransmitted data unit matches the size of the coded newly transmitted data unit. In this way, sizes of data units in the first data unit generated based on the coded retransmitted data unit and the coded newly transmitted data unit are the same. This improves coding efficiency and coding performance, and subsequent possible retransmission is further considered. Because the sizes of the data units are the same, complexity of matching a transmission opportunity during retransmission can be reduced, so that a transmission delay can be reduced, and transmission performance can be improved.

In a possible implementation, third indication information is sent. The third indication information indicates the quantity of coded newly transmitted data units, or indicates the quantity of to-be-coded newly transmitted data units and a coding bit rate, or indicates the size of the to-be-coded newly transmitted data unit or the size of a coded newly transmitted data unit.

The first coding apparatus receives the third indication information, and therefore the first coding apparatus can determine a size of a to-be-transmitted newly transmitted data unit (for example, the to-be-coded newly transmitted data unit or the coded newly transmitted data unit) based on the quantity of coded newly transmitted data units. In this way, the to-be-coded newly transmitted data unit or the coded newly transmitted data unit generated by the first coding apparatus can satisfy another transmission requirement (for example, a quantity of coded newly transmitted data units, or a quantity of to-be-coded newly transmitted data units, or a coding bit rate determined by another protocol layer), to improve applicability of the first coding apparatus.

In a possible implementation, fourth indication information is sent. The fourth indication information indicates a quantity of to-be-coded retransmitted data units and a coding bit rate, or indicates a quantity of coded retransmitted data units, or indicates the size of the to-be-coded retransmitted data unit or a size of the coded retransmitted data unit.

The fourth indication information is sent by the first coding apparatus, so that a decoder side can receive the fourth indication information, and then decode, based on the fourth indication information, the first data unit output by the first coding apparatus, to correctly receive newly transmitted data in the fourth data unit and retransmitted data.

According to a second aspect, a coding apparatus is provided. For example, the coding apparatus is the foregoing described first coding apparatus. The first coding apparatus is configured to perform the method in any one of the first aspect or the possible implementations. Specifically, the first coding apparatus may include modules configured to perform the method in any one of the first aspect or the possible implementations, for example, a processing module and a transceiver module. For example, the transceiver module may include a sending module and a receiving module. The sending module and the receiving module may be different functional modules, or may be a same functional module implementing different functions. For example, the first coding apparatus is a communication device, or is a chip or another component disposed in the communication device. For example, the communication device is a network device or a terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module implementing different functions. For example, if the first coding apparatus is the communication device, the transceiver is implemented by, for example, an antenna, a feeder, and a codec in the communication device. Alternatively, if the first coding apparatus is the chip disposed in the communication device, the transceiver (or the transmitter and the receiver) is, for example, a communication interface in the chip. The communication interface is connected to a radio frequency transceiver component in the communication device, to send and receive information by using the radio frequency transceiver component. Alternatively, the communication interface may further implement information transfer inside the chip, or implement information transfer between the chip and another functional module.

For technical effects brought by the second aspect or the optional implementations of the second aspect, refer to the descriptions of the technical effects of the first aspect or the corresponding possible implementations of the first aspect.

According to a third aspect, a coding apparatus is provided. For example, the coding apparatus is the foregoing described first coding apparatus. The coding apparatus includes a processor and a communication interface. The communication interface may be configured to communicate with another apparatus or device. Optionally, the coding apparatus may further include a memory, configured to store computer instructions. The processor and the memory are coupled to each other, to implement the method according to the first aspect or the possible implementations. Alternatively, the first coding apparatus may not include a memory, and the memory may be located outside the first coding apparatus. The processor, the memory, and the communication interface are coupled to each other, to implement the method according to the first aspect or the possible implementations. For example, when the processor executes the computer instructions stored in the memory, the first coding apparatus is enabled to perform the method according to any one of the first aspect or the possible implementations. For example, the first coding apparatus is a communication device, or is a chip or another component disposed in the communication device. For example, the communication device is a network device or a terminal device.

For example, if the first coding apparatus is the communication device, the communication interface is implemented by a transceiver (or a transmitter and a receiver) in the communication device, and the transceiver is implemented by, for example, an antenna, a feeder, and a codec in the communication device. Alternatively, if the first coding apparatus is the chip disposed in the communication device, the communication interface is, for example, an input/output interface such as an input/output pin in the chip. The communication interface is connected to a radio frequency transceiver component in the communication device, to send and receive information by using the radio frequency transceiver component. Alternatively, the communication interface may further implement information transfer inside the chip, or implement information transfer between the chip and another functional module.

According to a fourth aspect, a computer-readable storage medium is provided. The computer-readable storage medium is configured to store a computer program. When the computer program is run on a computer, the computer is enabled to perform the method according to any one of the first aspect or the possible implementations.

According to a fifth aspect, a computer program product including instructions is provided. The computer program product is configured to store a computer program. When the computer program is run on a computer, the computer is enabled to perform the method according to any one of the first aspect or the possible implementations.

DESCRIPTION OF EMBODIMENTS

Figure 1A:
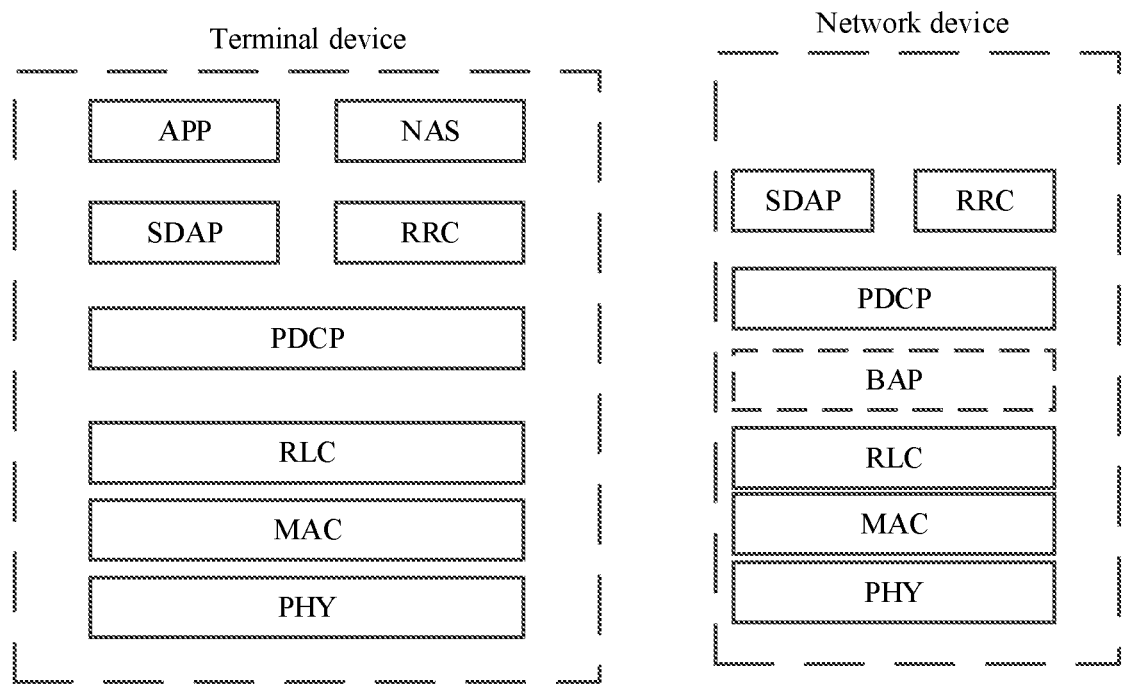
FIG. 1a is a schematic architectural diagram of protocol layers according to an embodiment of this disclosure.

The following describes embodiments of this disclosure in detail with reference to the accompanying drawings.
(1) Protocol Layer Communication between a terminal device and a network device may be in accordance with a specific protocol layer structure. For example, referring to FIG. 1a, a control plane protocol layer structure between the terminal device and a base station may include functions of protocol layers such as a radio resource control (RRC) layer, a packet data convergence protocol (PDCP) layer, a backhaul protocol (backhaul adaptation protocol, BAP) layer, a radio link control (RLC) layer, a media access control (MAC) layer, and a physical (PHY) layer. A user plane protocol layer structure between the terminal device and the network device (for example, a radio access network (RAN) device) may include functions of protocol layers such as a PDCP layer, an RLC layer, a MAC layer, and a physical layer. The RRC layer, the PDCP layer, the RLC layer, the MAC layer, and the physical layer may be collectively referred to as an access stratum.

The RRC layer is used for broadcasting of system messages, paging, RRC connection management, security management, bearer management, mobility management, and the like. The RRC layer in the terminal device receives uplink data sent by an upper layer, and place the uplink data in an RRC uplink direct transfer message; and obtains downlink data from an RRC downlink direct transfer message, and delivers the data to the upper layer. When the RRC layer in the terminal device needs to obtain uplink data from an application layer in the terminal device, a data interface may be set between the application layer in the terminal device and an RRC entity in the terminal device, and the application layer in the terminal device may deliver the data to the RRC entity in the terminal device via the newly set data interface. The RRC entity in the RAN device may further implement direct transparent transmission of data between the RAN device and a UPF network element.

The PDCP layer is responsible for processing messages from an RRC layer on a control plane and IP packets from an upper layer on a user plane. The PDCP layer mainly includes the following functions: security (such as encryption, decryption, integrity protection, and integrity verification), header compression, header decompression, and the like. The PDCP layer may encapsulate obtained data into a PDCP packet, and then send the PDCP packet to the upper layer or the UPF network element.

Backhaul adaptation protocol layer: For example, the BAP layer has at least one of the following capabilities: adding, to a packet, routing information identifiable by a wireless backhaul node; performing routing selection based on the routing information identifiable by the wireless backhaul node; adding, to a packet, identification information identifiable by the wireless backhaul node and related to quality of service (QoS) requirements; performing QoS mapping on a plurality of links including the wireless backhaul node for a packet; adding packet type indication information to a packet; and sending flow control feedback information to a node capable of flow control. It should be noted that features or content denoted by dashed lines in the accompanying drawings of this application may be understood as optional operations or optional structures in embodiments of this application.

The RLC layer is located between the PDCP layer and the MAC layer. The RLC layer mainly has the following functions: reordering, segmentation, reassembly, and cascading of packets transmitted from the PDCP layer.

The RLC layer may execute a feedback-based retransmission mechanism and an automatic repeat request (ARQ) mechanism. ARQ is a function in an acknowledged mode (AM) in transmission modes of the RLC layer. ARQ operations at a transmitting end include transmitting and retransmitting a PDU or segmentation, receiving a status report sent by a receiving end, and receiving a HARQ sending failure indication sent by a next layer. ARQ operations at the receiving end include detecting whether an RLC PDU fails to be received, and periodically feeding back a data receiving status to the transmitting end via an RLC status report. The status report includes information such as an RLC serial number (SN) received by the receiving end and an SN not received. When detecting packet loss, the receiving end notifies, by sending the RLC status report, the transmitting end that an AM PDU or a re-segmentation has not been received, and requests the transmitting end to retransmit the PDU. A relationship between a HARQ mechanism of the MAC layer and an ARQ mechanism of the RLC layer is as follows: Retransmission is performed through ARQ only when retransmission still fails after maximum HARQ retransmissions.

The MAC layer is used for scheduling, priority handling, hybrid automatic repeat request (HARQ), and the like.

An HARQ protocol is a function of the MAC layer. HARQ operations at the transmitting end include transmitting and retransmitting a TB, and receiving and processing acknowledgment (ACK) information and/or negative acknowledgment (NACK) information. HARQ operations at the receiving end include receiving the TB, performing soft combination processing, and generating and feeding back the ACK/NACK information. After the transmitting end transmits a TB, the receiving end receives the TB and performs cyclic redundancy check (CRC) on the TB. If the CRC succeeds, the receiving end feeds back a positive acknowledgment (ACK) to the transmitting end. If the CRC fails, the receiving end feeds back a negative acknowledgment (NACK). If receiving the ACK information, the transmitting end performs new transmission. If receiving the NACK information, the transmitting end performs retransmission.

The PHY layer is used for modulation/demodulation, coding, multi-antenna mapping, and the like.

Each protocol layer in the terminal device and the network device may correspond to an entity. For example, the RRC layer corresponds to an RRC entity. For the PDCP layer, one radio bearer corresponds to one PDCP entity, and one logical channel needs to correspond to one PDCP entity.

(2) Blind Retransmission Mechanism

Due to limitations of an air interface transmission delay, a data processing delay at the receiving end, and a potential feedback occasion, the feedback-based retransmission mechanism has a large delay.

Therefore, to reduce the delay, blind retransmission may be performed. For example, if the transmitting end does not receive HARQ feedback information from the receiving end, or the receiving end does not have HARQ feedback, the transmitting end repeatedly sends data to the receiving end. In blind retransmission, retransmission is performed not based on feedback information, and therefore the delay can be reduced. However, resources are occupied for retransmission regardless of whether initially transmitted data is correct, resulting in low spectral efficiency.

(3) Network Coding

For the problems in the feedback retransmission mechanism or the blind retransmission, a network coding technology may be used to perform network coding on data units, to achieve a tradeoff between a delay and spectral efficiency performance by transmitting a network coded data unit. In network coding, a coder end may perform random linear combination on a to-be-coded data unit (which may also be referred to as source data, a to-be-coded packet, a to-be-coded data block (block), a to-be-coded data object, a to-be-coded data batch (batch), a to-be-coded data generation, or the like, which is not limited herein), to generate a plurality of pieces of network coded data. A decoder end can restore the source data as long as the decoder side receives enough network coded data. Therefore, the loss of a specific piece of data during data transmission does not affect decoding performance. A retransmission delay of a packet during transmission can be reduced through network coding, and coded data can be transmitted through a plurality of transmission paths, to improve data transmission reliability. For example, in system architectures shown in FIG. 2a to FIG. 2d, there may be a plurality of transmission paths between the terminal device and the network device. A transmission path may include a plurality of nodes, for example, a terminal device and a network device, or a terminal device and one or more radio access network devices, or one or more wireless backhaul devices.

One of network coding schemes is a block coding-based network coding technology, for example, an RLNC (Random Linear Network Coding) technology. In this application, any one of the following network coding schemes may be used: random linear network coding, deterministic linear network coding, batch sparse code (BATS), erasure code, fountain code, convolutional network coding (CNC), stream code, and the like. This is not limited herein.

Figure 1B:
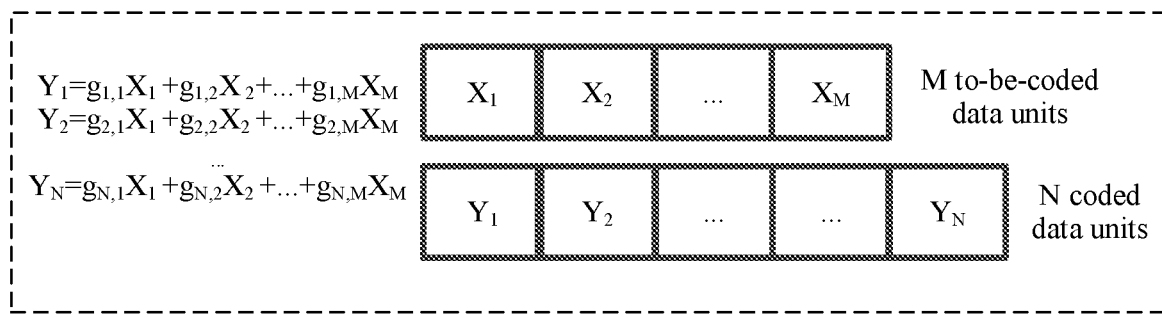
FIG. 1b is a schematic diagram of a coding method according to an embodiment of this disclosure.

A basic principle of RLNC-based network coding is shown in FIG. 1B. The transmitting end divides a packet to be sent into one or more groups of RLNC-based to-be-coded data blocks. One group of RLNC-based to-be-coded data blocks includes M to-be-coded data units, and the M to-be-coded data units are represented by $X_1, X_2, \ldots, X_M$. The M to-be-coded data units X are coded to generate N coded data units Y, where the N coded data units may be represented by $Y_1, Y_2, \ldots, Y_N$, (N≥M), and the N coded data units Y may satisfy the following formula:

$$Y_n = \Sigma_{m=1}^{M} g_{n,m} \times X_m.$$

The N coded data units Y may be generated by performing a linear combination operation on the M to-be-coded data units in a finite field or a Galois field (GF). $Y_n$ represents an $n^{th}$ coded data unit, $X_m$ represents a $m^{th}$ to-be-coded data unit, $g_{n,m}$ represents a weighting coefficient used for the $m^{th}$ to-be-coded data unit $X_m$ when the M to-be-coded data units are coded to generate the $n^{th}$ coded data unit, and $g_{n,m}$ is an element randomly selected from the finite field or the GF. The GF is a field including a finite quantity of elements, and GF(q) represents a GF including q elements. GF(q) represents elements in $\{0, 1, \ldots, q-1\}$, and a size of the GF may be predefined, or may be configured by a network device. A difference between the deterministic linear network coding and the random linear network coding is that a coefficient used for the deterministic linear network coding is not randomly selected, but is specified or configured by the network device.

Header information of a coded data unit $Y_n$ may carry a coding coefficient vector $[g_{n,1}, g_{n,2}, \ldots, g_{n,M}]$ for generating the coded data unit, or header information of a coded data unit $Y_n$ may carry indication information of a coding coefficient vector for generating the coded data unit, to indicate the coding coefficient vector. Dimensions of the coding coefficient vector are the same as a quantity M of to-be-coded data units in a to-be-coded data block.

The transmitting end sends N coded data units to the receiving end for a group of RLNC-based coded data blocks. When a quantity of coded data units received by the receiving end is not less than M, and a rank of a matrix formed by coding coefficient vectors carried in header information of the coded data units is M, the receiving end receives the M coded data units with linearly independent coding coefficients.

In this way, the receiving end may construct a system of linear equations based on the coding coefficient vectors and the received M coded data units with linearly independent coding coefficients, and may further decode M to-be-coded data units $X_m$, m∈{1,2, . . . ,M} based on the system of linear equations.

For example, when correctly receiving all the N coded data units $Y_1, Y_2, \ldots, Y_N$ sent by the transmitting end, the receiving end may determine header information of the N coded data units. Header information of a received coded data unit $Y_k$ includes a piece of indication information indicating a coding coefficient vector $[g_{k,1}, g_{k,2}, \ldots, g_{k,M}]$ with a length of M. Therefore, for the header information of the N coded data units, a coding coefficient matrix G with N×M dimensions may be determined, a rank of the coding coefficient matrix G is M, and the coding coefficient vector G satisfies:

$$G = \begin{bmatrix} g_{1,1} & g_{1,2} & \cdots & g_{1,M} \\ g_{2,1} & g_{2,2} & \cdots & g_{2,M} \\ \vdots & \vdots & \ddots & \vdots \\ g_{N,1} & g_{N,2} & \cdots & g_{N,M} \end{bmatrix}$$

Because the coded data unit is generated by performing linear combination on the to-be-coded data unit, a relationship between the coded data unit Y and the to-be-coded data unit X may satisfy the following formula: Y=G×X. Therefore, the receiving end may decode the M to-be-coded data units X by solving the foregoing formula.

Addition and multiplication operations in GF(q) may be involved in network coding. For example, $X_m$, 1≤m≤M is an 8-bit data unit, and a size of the GF is 4, that is, GF(4), q=4, and $g_{i,m}$ ∈ GF(4). An operation of $Y_i = \Sigma_{m=1}^{M} g_{i,m} \times X_m$ on GF(4) means that 4, with a size of L' are sequentially divided into a plurality of groups of bits, and one group includes $\log_2 q$ bits. A rule for one times of operation is as follows: selecting $\log_2 q$ bits with same locations as that of $[X_1, X_2, \ldots, X_M]$, sequentially multiplying $\log_2 q$ bits by $[g_{i,1}, g_{i,2}, \ldots, g_{i,M}]$ in GF(4) to obtain operation results, and adding the operation results to obtain an operation result, where the operation result includes $\log_2 q$ bits. For example, for the first time, the first two bits in $[X_1, X_2, \ldots, X_M]$ are selected, and are sequentially multiplied by $[g_{i,1}, g_{i,2}, \ldots, g_{i,M}]$ to obtain operation results, and then the operation results are added to obtain a 2-bit operation result, where the 2-bit operation result is placed at the first two bit locations of a coded data unit $Y_i$. For the second time, the third and fourth bits in $[X_1, X_2, \ldots, X_M]$ are selected, and are sequentially multiplied by $[g_{i,1}, g_{i,2}, \ldots, g_{i,M}]$ to obtain operation results, and then the operation results are added to obtain a 2-bit operation result, where the 2-bit operation result is placed at the third and fourth bit positions of the coded data unit $Y_i$. By analogy, an 8-bit coding operation is completed to obtain an 8-bit coded data unit $Y_i$. The multiplication and addition operations involved above are polynomial operations on GF. An example of a polynomial operation rule of the GF is as follows:

Multiplication in the GF: Elements in the GF may be generated by using a primitive polynomial P(x) in the field. Polynomial multiplication in the GF may convert, by converting a value into a polynomial, a multiplication operation in the GF into common polynomial multiplication and then modulo the primitive polynomial P(x). When q=4, the primitive polynomial of GF(4) satisfies P(x)=x^2+x+1. A piece of 2-bit data (for example, '10', which is converted into a polynomial x) is multiplied by a piece of 2-bit data (for example, '11', which is converted into a polynomial x+1). The polynomial multiplication is to multiply each item of one polynomial with each item of another polynomial, then coefficients of the items with a same exponent are added, where x*(x+1)=x^2+x, and multiplication in GF(4) needs to mod P(x)=x^2+x+1, to obtain a result as (x^2+x) mod (x^2+x+1)=1, that is, the result is '01'.

Addition in the GF: A value is converted into a polynomial. When like items with a same order are merged, an exclusive OR operation is performed in polynomial addition, that is, 0+0=0, 1+1=0, and 0+1=1+0=1. A piece of 2-bit data (for example, '10', which is converted into a polynomial x) is added to a piece of 2-bit data (for example, '11', which is converted into a polynomial x+1), to obtain a result as 0*x+1, that is, '01'.

In a radio channel environment, errors occur in some coded data units received by the receiving end due to factors such as signal strength fading caused by channel noise or mobility or interference from other users. As long as a quantity L of coded data units received correctly by the receiving end is not less than the quantity M of to-be-coded data units, a rank of a matrix that can be formed by coding coefficient vectors determined from header information of the L coded data units is M, that is, M linear independent systems of linear equations corresponding to the M to-be-coded data units may be determined. In this way, the receiving end may decode the M to-be-coded data units based on the received L coded data units and the determined coding coefficient vectors.

Therefore, the transmitting end does not need to wait for a feedback request from the receiving end for retransmission with the use of the RLNC technology. The transmitting end may send several coded data units in advance to resist impact of radio channels, to reduce a delay. In addition, no numerous resources need to be consumed for blind retransmission of TBs, avoiding a waste of spectrum resources.

(4) Coding Layer

In this application, protocol layers having a coding/decoding function may be collectively referred to as a coding layer. The coding/decoding function may be a network coding function, or may be a coding/decoding function similar to the network coding function. This is not limited herein. A data unit before coding is referred to as a to-be-coded data unit, and a data unit generated by coding the to-be-coded data unit is referred to as a coded data unit. The coded data unit may be a data unit output by a module at the coding layer. The output coded data unit may be understood as coded data unit that is output by the terminal device or the network device through a communication interface to a module for subsequent processing. It may be understood that output in this application means to send a signal or data over an air interface, or output a signal or data to another module in the apparatus (for example, the terminal device or the network device) through the communication interface. A specific process is specifically described in an application scenario. Details are not described herein.

The coding layer may be an RLC layer, a packet data convergence protocol (PDCP) layer, a backhaul adaptation layer, a MAC layer, or a physical (PHY) layer. Alternatively, the coding layer may be a protocol layer other than the MAC layer, the RLC layer, the BAP layer, and the PDCP layer. For example, the coding layer has the network coding function. The coding layer may be a protocol layer added above the PDCP layer, where the protocol layer has the network coding function; a coding layer added above the BAP layer; a coding layer added between the PDCP layer and the RLC layer; a coding layer added between the RLC layer and the MAC layer; or a coding layer added between the MAC layer and the PHY layer. This is not specifically limited in embodiments of this application. For example, the coding layer mentioned in this application may also be referred to as a network coding (NC) layer, a coding/decoding layer, a network coding/decoding layer, or another name. This is not limited in this application. If the coding layer is at the RLC layer, the RLC layer implements the coding function, which is also referred to as a coding mode. The coding mode may be used as a new transmission mode, different from an acknowledged mode (AM), an unacknowledged mode (UM), and a transparent mode (TM). Alternatively, the coding/decoding function may be implemented in the AM or the UM.

(5) Data Unit

A coded data unit may also be referred to as a coded data group, a coded data segment, a coded packet, a coded data block, a coded packet, or the like. The coded data unit is obtained by coding a to-be-coded data unit. The to-be-coded data unit may be obtained from data that is sent by a previous protocol layer to the coding layer and that is received by the coding layer. The to-be-coded data unit may also be referred to as an original packet, an original data unit, a data group, a data segment, a packet, a data block, a packet, or the like.

Figure 1C:
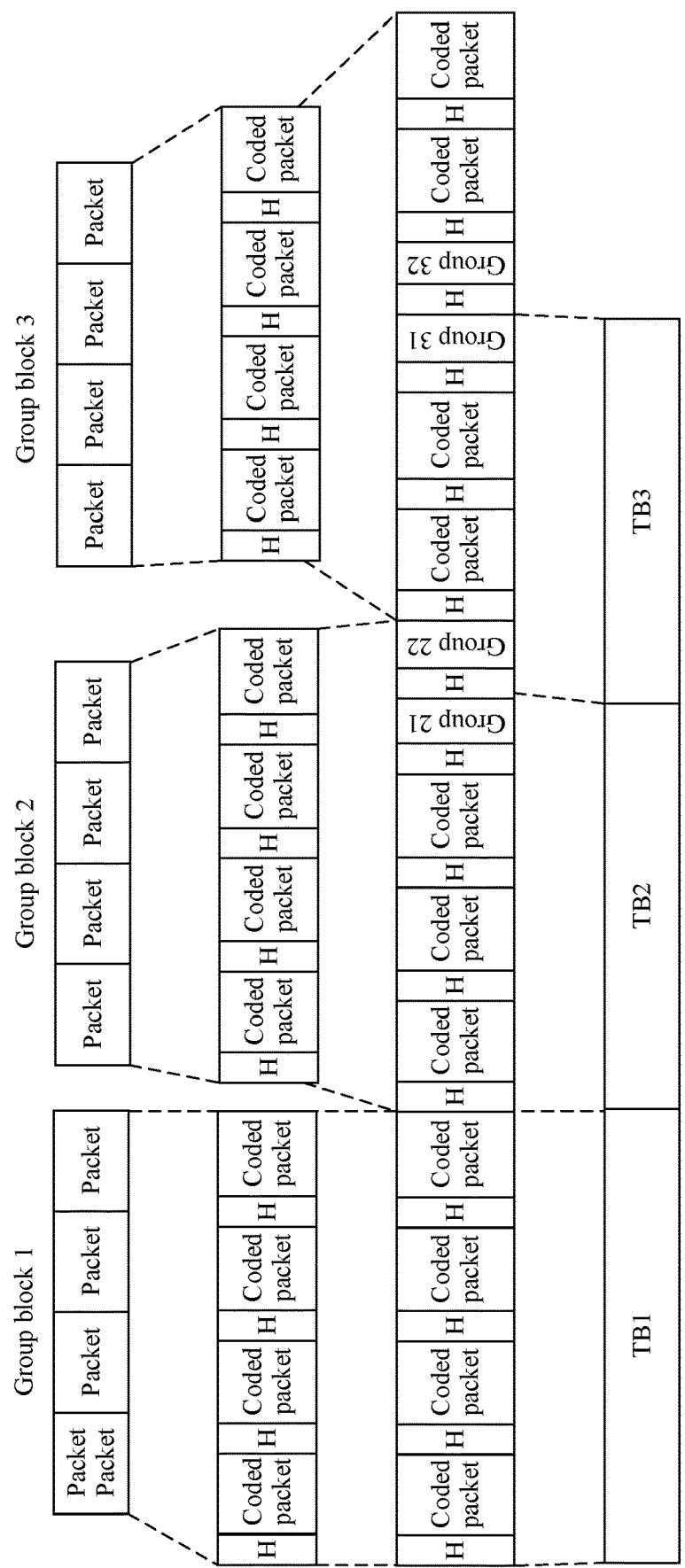
FIG. 1c is a schematic diagram of a coding method according to an embodiment of this disclosure.

For ease of description, in the following embodiments, packets received from an upper layer of the coding layer (for example, if the coding layer is the RLC layer, the upper layer may be the PDCP layer) by modules at the coding layer may be collectively referred to as a second data unit. The transmitting end determines, as required from received packets, packets to be output, and divides the packets to be output, to determine a data object, a data block, a data batch, or a data generation. The transmitting end divides the packets to be output into to-be-coded data blocks, to determine a to-be-coded data unit based on a size or a length of the to-be-coded data unit included in a data block. A size or a length of a to-be-coded data unit included in each to-be-coded data block may be a predefined fixed value or a value configured by the network device. For example, as shown in FIG. 1c, there are three to-be-coded data blocks: block 1, block 2, and block 3, and each block includes four to-be-coded data units. Therefore, it may be determined, based on the size or the length of the to-be-coded data unit included in each to-be-coded data block, that there are four to-be-coded data units in one data block. Certainly, the to-be-coded data unit may alternatively be determined based on a packet to be output. This is not limited herein.

A coding operation may be performed, through network coding, on a plurality of to-be-coded data units included in the to-be-coded data block, to generate coded data units (for example, coded packets shown in FIG. 1c) and coded data blocks. The size of the to-be-coded data unit is the same as a size of the coded data unit, or the length of the to-be-coded data unit is the same as a length of the coded data unit. For ease of description, a size or a length of a data unit is collectively referred to as a size of the data unit below. For example, if a to-be-coded data block includes four to-be-coded data units each with a size of 1000 bytes, the to-be-coded data block may generate four coded data units each with a size of 1000 bytes, and a generated coded data block includes the four coded data units. A complete coded packet or coded data unit (for example, a PDU) that can be output may be generated by adding header information to a coded data unit. The coded data unit may be output to the receiving end via a TB at the physical layer.

(6) Adaptive Modulation and Coding

To ensure transmission quality of radio links, air interface transmission rate control technologies such as an AMC technology are used to adjust a modulation scheme and a coding rate for radio link transmission. The transmitting end selects, in a scheduling period, transmission time interval, or transmission opportunity, a proper MCS based on CSI fed back by the receiving end. When channel quality is good, the MCS is enhanced by using an AMC algorithm. When the channel quality is poor, the MCS is lowered by using the AMC algorithm. A size of a TB is calculated based on the adjusted MCS and a size of a physical resource. That is, the size of the TB transmitted at different transmission opportunities changes dynamically.

The size of the TB is adaptively adjusted based on the size of the physical resource and channel state information. As a result, the size of the TB in a transmission opportunity varies. In a network coding scheme, as coded data units of a fixed size need to be transmitted via a TB, a size of a coded data unit or sizes of an integer quantity of coded data units does or do not match the size of the TB. If the coded data unit is segmented using the RLC layer segmentation technology, header information needs to be added to the segmented data unit, where the header information indicates segmentation information. Because coding information further needs to be sent to the receiving end for decoding, the coding information needs to be added to the header information of the segmented data unit, resulting in an increase in header information overheads.

As shown in FIG. 1c, for example, a size of a TB1 in the figure matches a size of four coded data units in the coded data block block 1. A size of a TB2 does not match a size of an integer quantity of coded data units. A size relationship shown in the figure is that the size of the TB2 is greater than the size of three coded data units and less than the size of four coded data units. In this case, the fourth coded data unit needs to be segmented, and header information needs to be separately added to the segments to obtain a first segment and a second segment of the fourth coded data unit in the block 2, to make a total size of the first three coded data units and the first segment of the fourth coded data unit adapted to the size of the TB2. A size relationship shown in the figure is that a size of a TB3 is equal to a size of three coded data units. However, because a segmented data unit newly generated in the block 2 needs to be sent in the TB3, the TB3 cannot carry the three coded data units in the block 3, the third coded data unit in the block 3 needs to be segmented, and header information needs to be separately added to the segments to obtain a first segment and a second segment of the third coded data unit in the block 3, to make the first two coded data units in the block 3, a data unit that is in the second segment in the block 2 and that has not been sent in the TB2, and a data unit in the first segment of the third coded data unit in the block 3 adapted to the size of the TB3. Therefore, an increase in extra header overheads caused by segmentation occupies limited physical resources, resulting in a decrease in system spectral efficiency.

Based on the foregoing problem, this application provides a coding method, to improve coding efficiency, reduce physical resources occupied for coding, and improve system spectral efficiency.

Technical solutions in embodiments of this application may be applied to various communication systems, for example, a long term evolution (LTE) system, a worldwide interoperability for microwave access (WiMAX) communication system, a 5th generation (5G) system, such as a new radio access technology (NR), and future evolved communication systems.

Figure 2A:
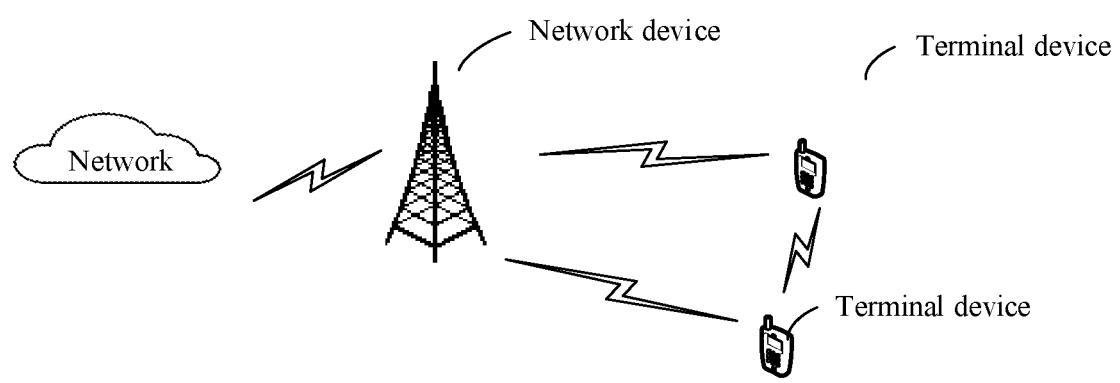
FIG. 2a to FIG. 2d are schematic diagrams of several communication system architectures according to an embodiment of this disclosure.

FIG. 2a is a schematic diagram of a possible system architecture to which an embodiment of this application is applicable. The system architecture shown in FIG. 2a includes a network device and terminal devices. As shown in FIG. 2a, point-to-point transmission is performed between the network device and the terminal device or between terminal devices. It should be understood that, a quantity of network devices and a quantity of terminal devices in the system architecture are not limited in embodiments of this application. Moreover, in addition to the network device and the terminal device, the system architecture to which embodiments of this application are applicable may further include other devices such as a core network device, a wireless relay device, and a wireless backhaul device. This is not limited in embodiments of this application either. In addition, the network device in embodiments of this application may integrate all functions into one independent physical device, or may distribute the functions on a plurality of independent physical devices. This is not limited in embodiments of this application either. In addition, the terminal device in embodiments of this application may be connected to the network device in a wireless manner.

The network device is, for example, an access network (AN) device, for example, a base station (for example, an access point), and may be a device that is in an access network and that communicates with a wireless terminal device over an air interface through one or more cells. The base station may be configured to mutually convert a received over-the-air frame and an internet protocol (IP) packet, and serve as a router between the terminal device and a remaining part of the access network. The remaining part of the access network may include an IP network. An road site unit (RSU) may be a fixed infrastructure entity supporting a V2X application, and may exchange messages with another entity supporting the V2X application. The network device may further coordinate attribute management of the air interface. For example, the network device may be an evolved NodeB (NodeB, eNB, or e-NodeB, evolved NodeB) in an LTE system or a long term evolution-advanced (LTE-A) system, or may be a next generation NodeB (gNB) in a 5G NR system, or may include a central unit (CU) and a distributed unit (distributed unit, DU) in a cloud access network (Cloud RAN) system. This is not limited in embodiments of this disclosure.

The terminal device is a device providing users with voice and/or data connectivity, for example, a handheld device having a wireless connection function, or a processing device connected to a wireless modem. The electronic device may communicate with a core network via a radio access network (RAN), and exchange voice and/or data with the RAN. The terminal device may be user equipment (UE), a wireless terminal device, a mobile terminal device, a device-to-device (D2D) communication terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively be a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

Figure 2B:
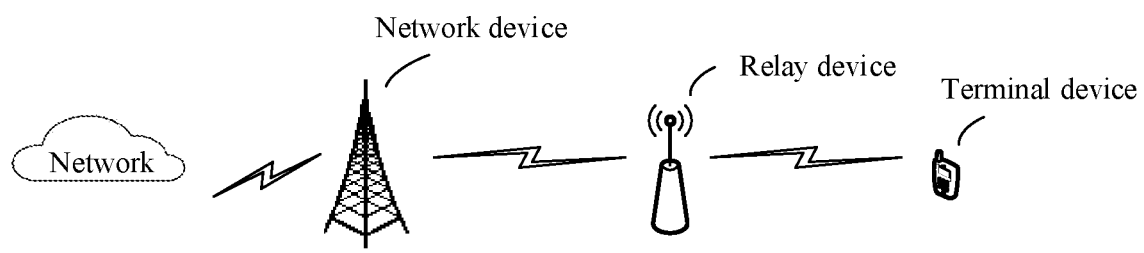

FIG. 2b is a schematic diagram of another possible system architecture to which an embodiment of this application is applicable. Multi-hop/relay (relay) transmission is performed between a network device and user equipment. A relay communication scenario shown in FIG. 2b may include a network device, a relay device, and a terminal device. The relay device may also be referred to as a relay terminal device (or a relay terminal), and the terminal device may also be referred to as a remote terminal device (or a remote terminal). In FIG. 2b, the relay device may relay the terminal device to the network device. For example, the relay device may be a terminal device, a communication apparatus having a relay function such as a relay station or a road site unit (RSU), or a chip in the communication apparatus. The relay device may alternatively be a communication chip having a communication module, a vehicle having a communication function, a vehicle-mounted device (for example, a vehicle-mounted communication apparatus or a vehicle-mounted communication chip), or the like. The terminal device may be a terminal device or a chip in the terminal device, and the terminal device may have a wireless transceiver function. For example, the terminal device can communicate (for example, communicate in a wireless manner) with one or more network devices in one or more communication systems, and receive a network service provided by the network device. The network device herein includes but is not limited to the network device shown in FIG. 1a or FIG. 2a to FIG. 2d. The network device and the terminal device may communicate with each other via the relay device. Therefore, even if the terminal device is located outside wireless signal coverage of the network device, the terminal device and the network device may still communicate with each other via the relay device. The relay device and the terminal device may communicate with each other through a sidelink (SL) interface (or referred to as a proximity-based service (ProSe) interface or a direct communication (PC5) interface). For example, the relay device may access the network device through a universal user-to-network interface (Uu) interface.

Figure 2C:
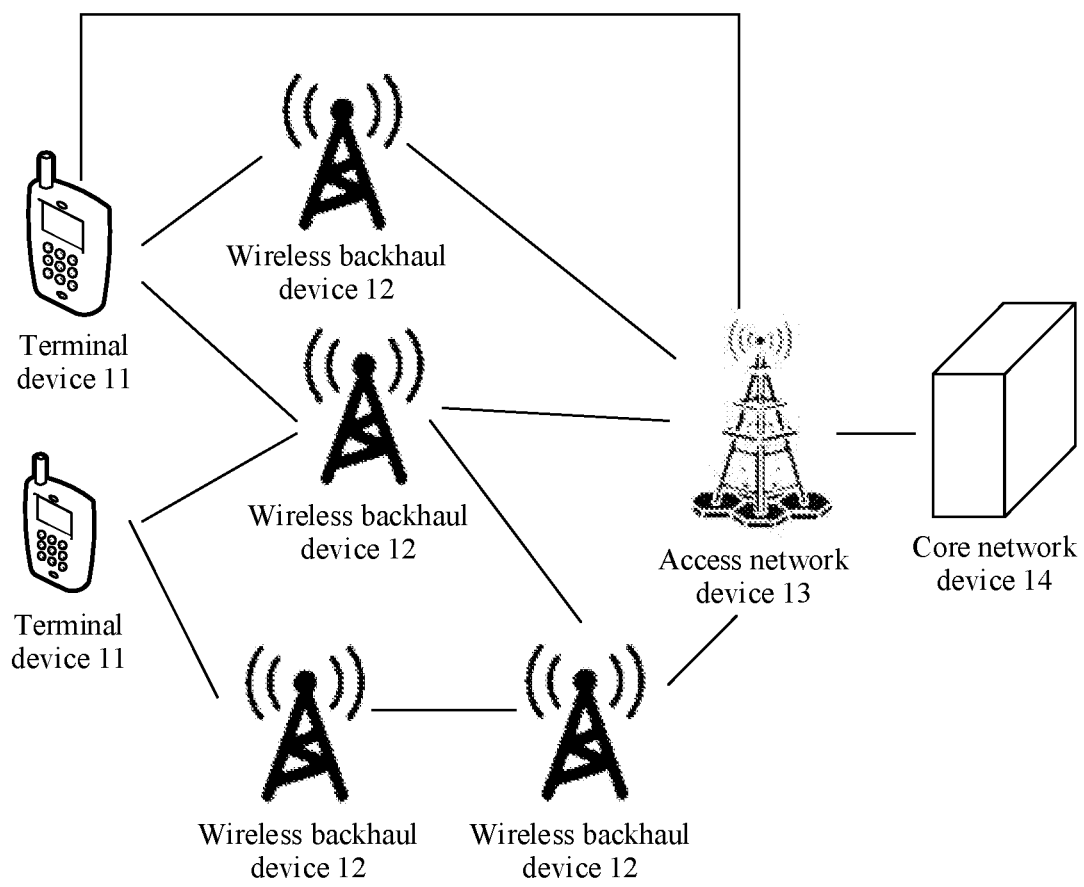

In another possible communication system architecture, there may be a plurality of relay devices. A wireless backhaul device may be further included. FIG. 2c is a schematic diagram of a communication system architecture to which this application is applicable. The communication system architecture includes a terminal device 11, a wireless backhaul device 12, an access network device 13, and a core network device 14. The terminal device 11 is connected to the wireless backhaul device 12 in a wireless manner. The terminal device 11 is connected to the access network device 13 via one or more wireless backhaul devices 12. The terminal device 11 may alternatively be connected to the access network device 13 in a wireless manner. The access network device 13 is connected to the core network device 14 in a wireless or wired manner. The core network device 14 and the access network device 13 may be different independent physical devices, or functions of the core network device 14 and logical functions of the access network device 13 may be integrated into a same physical device, or one physical device may integrate some functions of the core network device 14 and some functions of the access network device 13. The terminal device may be located at a fixed position, or may be mobile. Quantities of the core network device 14, the access network device 13, the wireless backhaul device 12, and the terminal device 11 are not limited in this application. Therefore, there may be a plurality of transmission paths between the terminal device 11 and the access network device 13. A transmission path may include a plurality of nodes, for example, a terminal device and a network device, or one or more wireless backhaul devices.

The wireless backhaul device may provide a backhaul service for a child node of the wireless backhaul device, and the child node of the wireless backhaul device may be a terminal device or another wireless backhaul device. The wireless backhaul apparatus may be a relay node (RN), an integrated access and backhaul (IAB) node, or another device capable of providing a wireless relay function. The IAB node may include a mobile terminal (MT) unit and a distributed unit (DU). When facing a parent node of the IAB node, the IAB node may be considered as user equipment, that is, a role of the MT. When facing a child node of the IAB node, the IAB node may be considered as a network device. The wireless backhaul device 12 and the terminal device 11 may be deployed on land, and include an indoor or outdoor device, a handheld device, or a vehicle-mounted device; or may be deployed on water; or may be deployed on a plane, a balloon, and a satellite in the air. Application scenarios of the radio access network device 13, the wireless backhaul device 12, and the terminal device 11 are not limited in embodiments of this application.

Figure 2D:
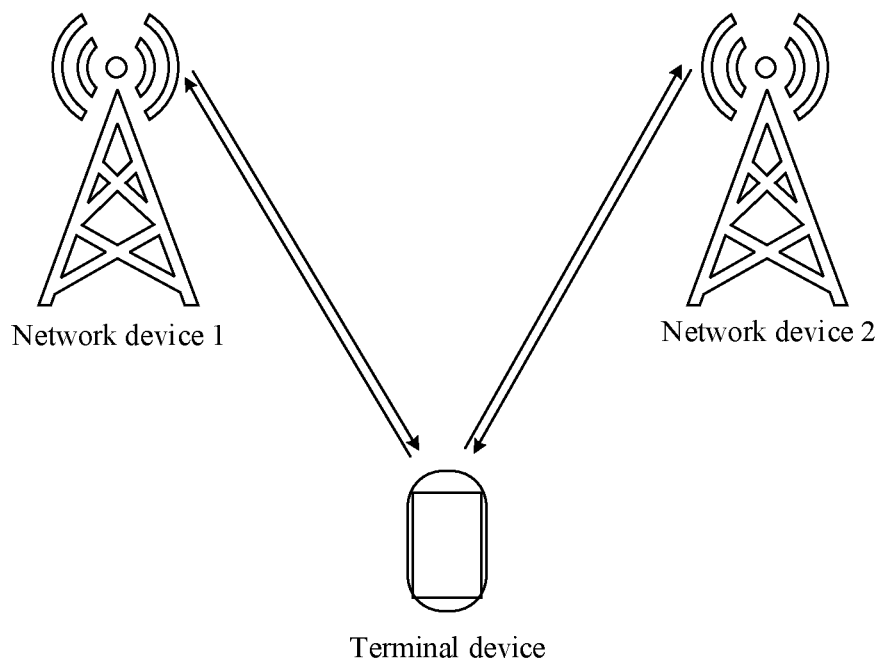

FIG. 2d is a schematic diagram of another possible system architecture to which an embodiment of this application is applicable. This architecture is applicable to a scenario such as dual connectivity (DC) or multi-connectivity between a plurality of network devices and user equipment. The dual connectivity scenario is used as an example. In an LTE system, a terminal device supports simultaneous access to two network devices. Such an access mode is referred to as a dual connectivity (DC) mode. One of the network devices is a primary network device, and the other network device is a secondary network device. In a development and evolution process of a wireless communication system, operators deploy both a 5G NR system and an LTE system, and a terminal device also supports access to both an LTE network device and an NR network device. Because LTE is also referred to as evolved universal terrestrial radio access (E-UTRA), this access mode is referred to as an EN-DC mode. In the EN-DC mode, the LTE network device is a primary network device, and the NR network device is a secondary network device. Certainly, with evolution of the system, a new radio evolved universal terrestrial radio access dual connectivity (NR E-UTRA dual connectivity, NE-DC) mode may also be supported in the future, that is, the NR network device is a primary network device, and the LTE network device is a secondary network device. Because terminal devices in the EN-DC mode and the NE-DC mode both access two network devices using different radio access technologies, these DC modes may also be collectively referred to as an MR-DC mode.

The system architecture shown in FIG. 2d includes two network devices and a terminal device. The two network devices are in a dual-connectivity architecture. For example, the network device 1 is a primary network device, and the network device 2 is a secondary network device. The terminal device may communicate with the two network devices. Certainly, a quantity of terminal devices in FIG. 2d is merely an example. During actual application, the network device may provide services for a plurality of terminal devices. In FIG. 2d, the network device is, for example, an access network device such as a base station. The access network device corresponds to different devices in different systems. For example, the access network device may correspond to an eNB in a 4G system, corresponds to an access network device such as a gNB in a 5G system, or is an access network device in a subsequently evolved communication system. For example, if FIG. 2d shows an EN-DC architecture, the network device 1 is an LTE network device, and the network device 2 is an NR network device; or if FIG. 2d shows an NE-DC architecture, the network device 1 is an NR network device, and the network device 2 is an LTE network device.

FIG. 2a to FIG. 2d are schematic diagrams of possible scenarios of a communication system to which this application is applicable. It should be noted that FIG. 2a to FIG. 2d are merely examples, and do not limit a network architecture applicable to this application. In addition, transmission modes such as uplink transmission, downlink transmission, access link, backhaul link, and sidelink are not limited in this disclosure.

For ease of understanding embodiments of this disclosure, the following describes an application scenario such as a scenario of using network coding technology to ensure system reliability or improve system spectral efficiency. Service scenarios described in embodiments of this disclosure are intended to describe the technical solutions in embodiments more clearly, but do not constitute any limitation on the technical solutions provided in embodiments of this disclosure. A person skilled in the art may learn that as new service scenarios emerge, for example, extended reality (XR), the technical solutions provided in embodiments of this disclosure are also applicable to a similar technical problem.

Figure 3:
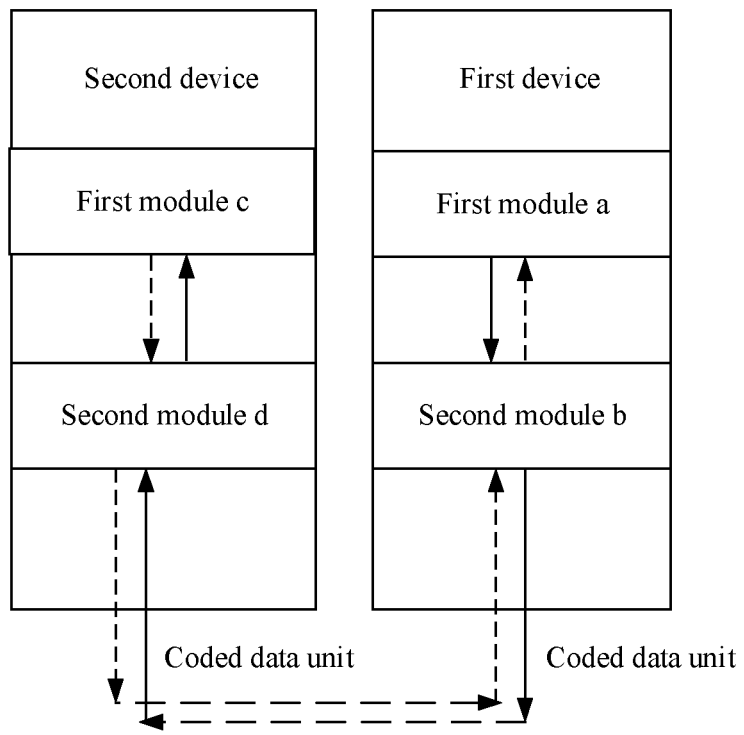
FIG. 3 is a schematic architectural diagram of an application scenario according to an embodiment of this disclosure.

As shown in FIG. 3, an example of an architectural diagram of an application scenario is provided. For example, a first device is used as a coding device and a second device is used as a decoding device. The first device includes a first module a and a second module b following the first module a. The second device includes a first module c and a second module d following the first module c.

The first module a of the first device may perform network coding on a data unit, and send a network coded data unit to the second module b. The second module b sends the network coded data unit to a decoder side, a next module, or a next protocol layer.

The second module d of the second device may receive the network coded data unit, and send the received network coded data unit to the first module c, and the first module c decodes the coded data unit.

The second module d of the second device or the second module b of the first device may be, for example, an air interface protocol layer of a route for transmitting the coded data unit over an air interface.

It should be noted that the first module c of the second device may also have the foregoing described function of performing network coding on the data unit by the first module a of the first device, and the second module d of the second device may also have the foregoing described function of sending the network coded data unit by the second module b of the first device.

The second module d of the second device may also have the foregoing described function of receiving the coded data unit by the second module d of the first device. The first module c of the second device may also have the foregoing described function of performing network coding on the coded data unit by the first module a of the first device. The second device and the first device may be different devices, and the second device receives the coded data unit sent by the first device.

With reference to examples of the network architectures in FIG. 2a to FIG. 2d, as shown in FIG. 3, during downlink transmission, the first device may be the network device, meaning that the network coding function is provided on the network device. The second device may be the relay device, the wireless backhaul apparatus, or the terminal device, meaning that the network decoding function is provided on the relay device, the wireless backhaul device, or the terminal device. For uplink transmission, the first device may be the relay device, the wireless backhaul device, or the terminal device, meaning that the network coding function of is provided on the relay device, the wireless backhaul device, or the terminal device. The second device may be the network device, meaning that the network decoding function is provided on the network device. The network device may be an eNB-CU (for example, an IAB donor CU), an eNB-DU (for example, an IAB donor DU), or an eNB, or may be a gNB-CU (for example, an IAB donor CU), a gNB-DU (for example, an IAB donor DU), or a gNB. In addition, if two terminal devices can directly communicate with each other to implement sidelink transmission, the second device and the first device may alternatively be two different terminal devices.

The first module c of the second device or the first module a of the first device may be a module at a protocol layer or a module at a protocol sublayer that has a network coding and/or decoding function.

With reference to FIG. 1a, the first module may be a network coding (network coding, NC) layer or may be a module of a sublayer protocol layer added to an original PDCP layer, for network coding and/or decoding. In this case, the first module a or the first module c may be the module of the sublayer protocol layer of the PDCP layer. Alternatively, the first module may be a module of a sublayer protocol layer added to an original BAP layer, for network coding and/or decoding. In this case, the first module may be the module of the sublayer protocol layer of the BAP layer. Similarly, the second module d of the second device or the second module b of the first device may be a module of the BAP layer or a module of the sublayer protocol layer of the BAP layer. That is, both the first module and the second module following the first module may be modules of the sublayer protocol layer of the BAP layer. The first module may alternatively be a module having a coding function at the RLC layer or a module having a coding function at the MAC layer. Details are not described herein again.

The second module d of the second device and the second module b of the first device may alternatively be modules of a lower protocol layer of the BAP layer, for example, a module of the RLC layer or a module of the MAC layer.

Alternatively, the second module d of the second device and the second module b of the first device may be newly defined modules at a protocol layer for implementing a routing function of a data unit on a radio link. A name of the second module is not limited in this disclosure.

The term "and/or" in this disclosure describes an association relationship for describing associated objects and represents that three relationships may exist. For example, A and/or B may represent the following three cases: Only A exists, both A and B exist, and only B exists. The character "/" usually indicates an "or" relationship between the associated objects. "A plurality of" in this disclosure means two or more. In the following detailed descriptions, terms such as "first" and "second" are only for distinction and description, but cannot be understood as indicating or implying relative importance, or as indicating or implying an order.

In addition, the word "example" in embodiments represents giving an example, an illustration, or a description. Any embodiment or implementation solution described as an "example" in this disclosure should not be understood as being more preferred or having more advantages than another embodiment or implementation solution. In particular, the word "example" is used to present a concept in a specific manner.

Figure 4A:
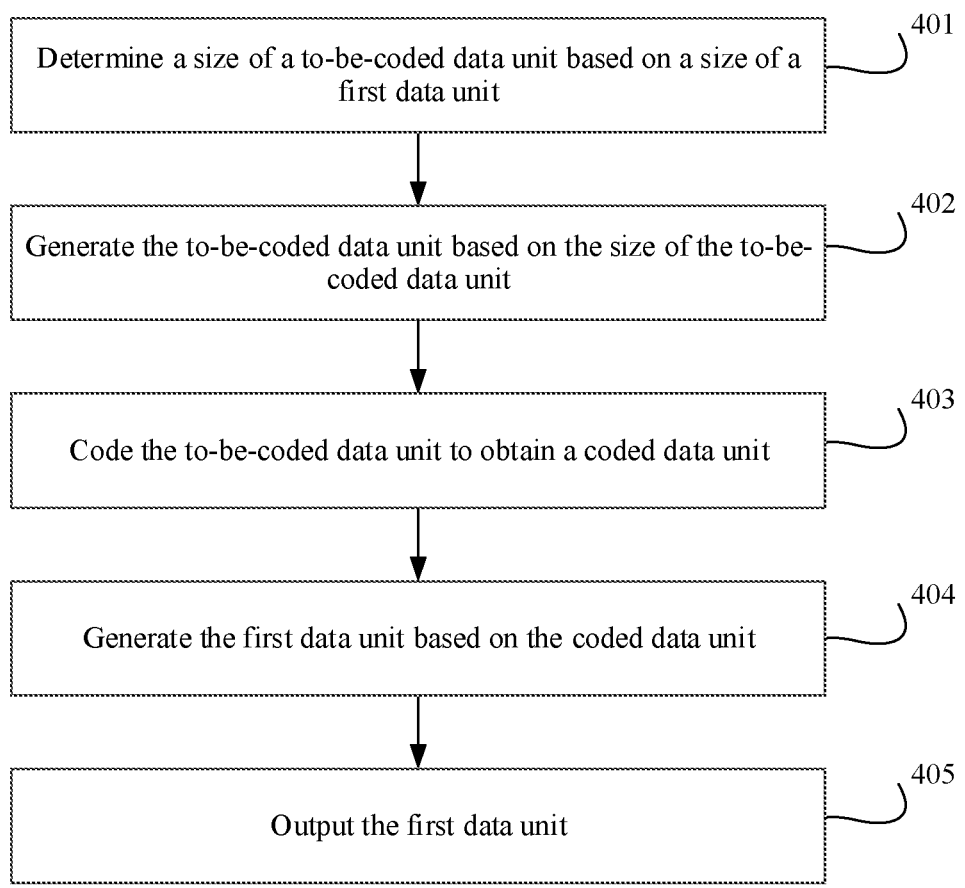
FIG. 4a is a schematic flowchart of a coding method according to an embodiment of this disclosure.

As shown in FIG. 4a, this disclosure provides a coding method. For example, coding is performed by a first module of a first device. For example, the first module may be the first module a of the first device in FIG. 3. For a manner in which coding is performed by a first module of a second device, refer to this embodiment. Details are not described herein. The following describes the solution in detail with reference to the accompanying drawings. The method includes the following steps.

Step 401: Determine a size of a to-be-coded data unit based on a size of a first data unit.

The first data unit may be a data unit transmitted by the first module to the second module. The first data unit may alternatively be a TB corresponding to a current transmission opportunity. Alternatively, the first data unit may be a PDU. A size of the PDU may be obtained via indication information. For example, the first module may be located at an RLC layer, and a MAC layer may send indication information to the RLC layer, where the indication information indicates the size of the PDU output by the RLC layer to a next protocol layer. The size of the PDU may correspond to a size of the TB in the current transmission opportunity and transmitted over an air interface. The first data unit may alternatively be a PDU that is output by the first module and that corresponds to an SDU received by the second module. A size of the SDU may correspond to the size of the TB in the current transmission opportunity and transmitted over the air interface.

In this embodiment of this application, there may be a plurality of manners of determining the size of the to-be-coded data unit. The following uses Manner A and Manner B as examples for description.

Manner A: The size of the to-be-coded data unit is determined based on the size of the first data unit and a quantity of coded data units. The size of the to-be-coded data unit may be determined based on different first data units. The following uses Manners A1 to A5 as an example for description. When the first data unit is a data unit of another type, refer to this example. Details are not described herein.

Manner A1: When the first data unit is the TB in the current transmission opportunity, a coded data block may be transmitted on the TB in the current transmission opportunity, and the coded data block may include N coded data units. N may be a value predefined or configured by a network device, for example, N=16. Therefore, a size of the coded data unit may be determined based on the first data unit and the quantity of coded data units, and therefore, the size of the to-be-coded data unit may accordingly be determined.

For example, a coded data block may be transmitted on the TB in the current transmission opportunity. A TB corresponds to N coded data units with headers added. In this case, a size L of a coded data unit with a header added may satisfy:

$$\left\lceil \frac{S1}{N} \right\rceil, \text{ or } \left\lfloor \frac{S1}{N} \right\rfloor.$$

S1 represents the size of the first data unit, $\lfloor \cdot \rfloor$ represents rounding down, and $\lceil \cdot \rceil$ represents rounding up.

The size L of the coded data unit with a header added may be determined based on the size of the first data unit and the quantity of coded data units. Because the size of the coded data unit is the same as the size of the to-be-coded data unit, there is a header size difference between the size of the to-be-coded data unit and the size of the coded data unit with a header added. Therefore, the size of the to-be-coded data unit may be determined by subtracting the header size from the coded data unit. The header size needs to be subtracted from L for a size L' of the to-be-coded data unit, that is, L'=L—H, where the header size H may be predefined, or the header size H may be set to different values as required. For example, a plurality of optional header sizes may be predefined, for example, a value of H may be preset to $H_1$ ($H_1$=16 bits) or $H_2$ ($H_2$=24 bits). In a possible implementation, a transmitting end may determine the header size based on the obtained value of L. For example, when L is less than or equal to a size of a first preset byte, the value of H may be 16 bits. When L is greater than or equal to a size of a second preset byte, the value of H may be 24 bits. The size of the first preset byte and the size of the second preset byte may be determined as required, and are not limited herein.

The transmitting end may send indication information to indicate the header size of the coded data unit. For example, header information in the coded data unit may include indication information indicating the header size. The indication information may be located in one or more bits in the header information. For example, the indication information may be located in one or more bits in a format field. For example, one bit in the format field in the header information carries the indication information. The bit in the format field equal to 0 indicates that the header size is $H_1$, and the bit in the format field equal to 1 indicates that the header size is $H_2$.

Therefore, the size of the to-be-coded data unit satisfies:

$$\left\lceil \frac{S1}{N} \right\rceil - H, \text{ or } \left\lfloor \frac{S1}{N} \right\rfloor - H$$

H represents a header size of a coded data unit header of the coded data unit.

Manner A2: When the first data unit is a part of the TB in the current transmission opportunity, for example, when K coded data blocks may be transmitted on the TB in the current transmission opportunity, a coded data block may include N coded data units. In this case, a TB corresponds to K×N coded data units with headers added. Therefore, a size L of the coded data unit with a header added may satisfy:

$$\left\lceil \frac{S1}{K \times N} \right\rceil, \text{ or } \left\lfloor \frac{S1}{K \times N} \right\rfloor.$$

Accordingly, the size of the to-be-coded data unit satisfies:

$$\left\lceil \frac{S1}{K \times N} \right\rceil - H, \text{ or } \left\lfloor \frac{S1}{K \times N} \right\rfloor - H$$

Manner A3: When the first data unit is a PDU determined based on indication information sent by a lower layer, the first data unit is a PDU output by the first module to the second module. For example, the first module is located at the RLC layer, and the MAC layer sends indication information to the RLC layer. The indication information indicates a size of an RLC PDU to be sent by the RLC layer to the MAC layer. The size may correspond to the size of the TB in the current transmission opportunity and transmitted over the air interface.

Assuming that the PDU transmits a coded data block, the size of the coded data unit may be determined based on the size of the first data unit and the quantity of coded data units, and the size of the to-be-coded data unit may accordingly be determined.

For example, the PDU (the first data unit) output by the first module to the second module includes a coded data block. In this case, the first data unit includes a coded data block, and a PDU corresponds to N coded data units with headers added. Therefore, a size L of a coded data unit with a header added may satisfy:

$$\left\lceil \frac{S1}{N} \right\rceil, \text{ or } \left\lfloor \frac{S1}{N} \right\rfloor.$$

In this case, S1 represents the size of the first data unit, that is, a size of the PDU output by the first module to the second module. Accordingly, the size of the to-be-coded data unit satisfies:

$$\left\lceil \frac{S1}{N} \right\rceil - H, \text{ or } \left\lfloor \frac{S1}{N} \right\rfloor - H.$$

Manner A4: When the size of the first data unit is a size of a PDU determined based on indication information sent by a lower layer, that is, the first data unit is a PDU output by the first module to the second module, assuming that the PDU transmits P coded data blocks, for example, the PDU (the first data unit) output by the first module to the second module includes P coded data blocks, the first data unit includes a coded data block, and a PDU corresponds to P×N coded data units with headers added. Therefore, a size L of a coded data unit with a header added may satisfy:

$$\left\lceil \frac{S1}{P \times N} \right\rceil, \text{ or } \left\lfloor \frac{S1}{P \times N} \right\rfloor.$$

S1 represents the size of the first data unit, that is, the size of the PDU output by the first module to the second module. Accordingly, the size of the to-be-coded data unit satisfies:

$$\left\lceil \frac{S1}{P \times N} \right\rceil - H, \text{ or } \left\lfloor \frac{S1}{P \times N} \right\rfloor - H.$$

Manner A5: For a scenario in which the first data unit is an SDU received by a next protocol layer or the second module b, for example, the first module is located at the RLC layer, and the second module is located at the MAC layer, the first module needs to send an RLC PDU to the second module. A size of the RLC PDU is determined based on a size of the SDU at the MAC layer. When the first module may determine the size of the SDU at the MAC layer based on indication information, that is, the first data unit is the SDU received by the MAC layer, it is assumed that a coded data block may be transmitted in the RLC PDU, and the coded data block includes N coded data units. In this case, when the first module sends the RLC PDU to the second module, the MAC SDU received by the second module may be the RLC PDU sent by the first module. Therefore, for determining the size of the to-be-coded data unit, refer to Manners A3 and A4. Details are not described herein again.

Manner B: The size of the to-be-coded data unit is determined based on the size of the first data unit and a quantity of to-be-coded data units. In a scenario of different first data units, the size of the to-be-coded data unit may be determined based on different first data units. The following uses Manners B1 to B4 as an example for description. When the first data unit is another data unit, refer to this example. Details are not described herein.

Manner B1: When the first data unit is the TB in the current transmission opportunity, a coded data block may be transmitted on the TB in the current transmission opportunity. The coded data block may include N coded data units, and a to-be-coded data block may include M to-be-coded data units. M may be a predefined value or a value configured by the network device, for example, M=8. In another possible implementation, M may be indirectly determined based on a quantity N of coded data units. Because a to-be-coded data unit in a to-be-coded data block needs to be coded to generate a coded data unit, during coding, the quantity N of coded data units included in the coded data block may be determined based on a coding bit rate R. The coding bit rate R is a ratio M/N of the quantity M of to-be-coded data units to the quantity N of coded data units, and R may also be referred to as a first coding bit rate. The coding bit rate may be determined depending on an actual requirement. For example, the coding bit rate may be determined based on a loss rate or an error rate of a coded data unit sent by a transmitting end to a receiving end. The quantity M of to-be-coded data units may be obtained based on the quantity N of coded data units corresponding to the coded data block and the network coding bit rate R. M satisfies M=⌊N×R⌋ or M=⌈N×R⌉, where ⌊·⌋ represents rounding down, and ⌈·⌉ represents rounding up.

For example, a size L of a coded data unit with a header added satisfies:

$$\left\lceil \frac{S1}{\frac{M}{R}} \right\rceil, \text{ or } \left\lfloor \frac{S1}{M/R} \right\rfloor.$$

S1 represents the size of the first data unit, M represents the quantity of to-be-coded data units, R represents the first coding bit rate, ⌊·⌋ represents rounding down, and ⌈·⌉ represents rounding up. The first coding bit rate is a coding bit rate used for coding the to-be-coded data unit.

Correspondingly, a size L' of the to-be-coded data unit is obtained by subtracting a header size from the size L of the coded data unit with a header added, that is, L'=L—H. For a manner of determining the header size H, refer to Manner A. Details are not described herein again.

Therefore, in a possible implementation, the size of the to-be-coded data unit satisfies:

$$\left\lceil \frac{S1}{\frac{M}{R}} \right\rceil - H, \text{ or } \left\lfloor \frac{S1}{M/R} \right\rfloor - H$$

H represents the header size of the coded data unit.

Manner B2: When the first data unit is a part of the TB in the current transmission opportunity, for example, when K coded data blocks may be transmitted on the TB in the current transmission opportunity, where K is an integer, a coded data block may include N coded data units. A TB corresponds to K×N coded data units with headers added. Therefore, a size L of a coded data unit with a header added may satisfy:

$$\left\lceil \frac{S1}{K \times \frac{M}{R}} \right\rceil, \text{ or } \left\lfloor \frac{S1}{K \times \frac{M}{R}} \right\rfloor.$$

Correspondingly, a size L' of a to-be-coded data unit satisfies:

$$\left\lceil \frac{S1}{K \times M/R} \right\rceil - H, \text{ or } \left\lfloor \frac{S1}{K \times M/R} \right\rfloor - H$$

Manner B3: When the first data unit is a PDU sent by the first module a to the second module b, the size of the first data unit is a size of the PDU. The PDU transmits a coded data block, and a to-be-coded data block corresponding to the coded data block includes M to-be-coded data units. In this case, the size of the to-be-coded data unit may be determined based on the size of the PDU and the quantity of to-be-coded data units. A size L' of a to-be-coded data unit satisfies:

$$\left\lceil \frac{S1}{\frac{M}{R}} \right\rceil - H, \text{ or } \left\lfloor \frac{S1}{M/R} \right\rfloor - H$$

Manner B4: When the first data unit is a PDU sent by the first module to the second module, the size of the first data unit is a size of the PDU. The PDU transmits P coded data blocks, where P is a positive integer. A to-be-coded data block corresponding to a coded data block includes M to-be-coded data units. In this case, the size of the to-be-coded data unit may be determined based on the size of the PDU and the quantity of to-be-coded data units. A size L' of a to-be-coded data unit satisfies:

$$\left\lceil \frac{S1}{P \times M/R} \right\rceil - H, \text{ or } \left\lfloor \frac{S1}{P \times M/R} \right\rfloor - H$$

For a scenario in which the first data unit is an SDU received by a next protocol layer or the second module, refer to Manner A5 to determine the size of the to-be-coded data unit. Details are not described herein again.

Step 402: Generate the to-be-coded data unit based on the size of the to-be-coded data unit.

Data (a second data unit) received by the first module may be received from an upper-layer protocol layer of the first module. When the first module is located a sublayer of a PDCP layer, the second data unit may be an SDU of the PDCP layer. When the first module is located at a next protocol layer of the PDCP layer, for example, the RLC layer in FIG. 1a, the second data unit may be an SDU of an NC layer or a PDU of the PDCP layer, or the second data unit may be an SDU of the RLC layer. When the first module is located at a next protocol layer of the PDCP layer, for example, a BAP layer, the second data unit may be an SDU of the BAP layer or a PDU of the PDCP layer.

Figure 4B:
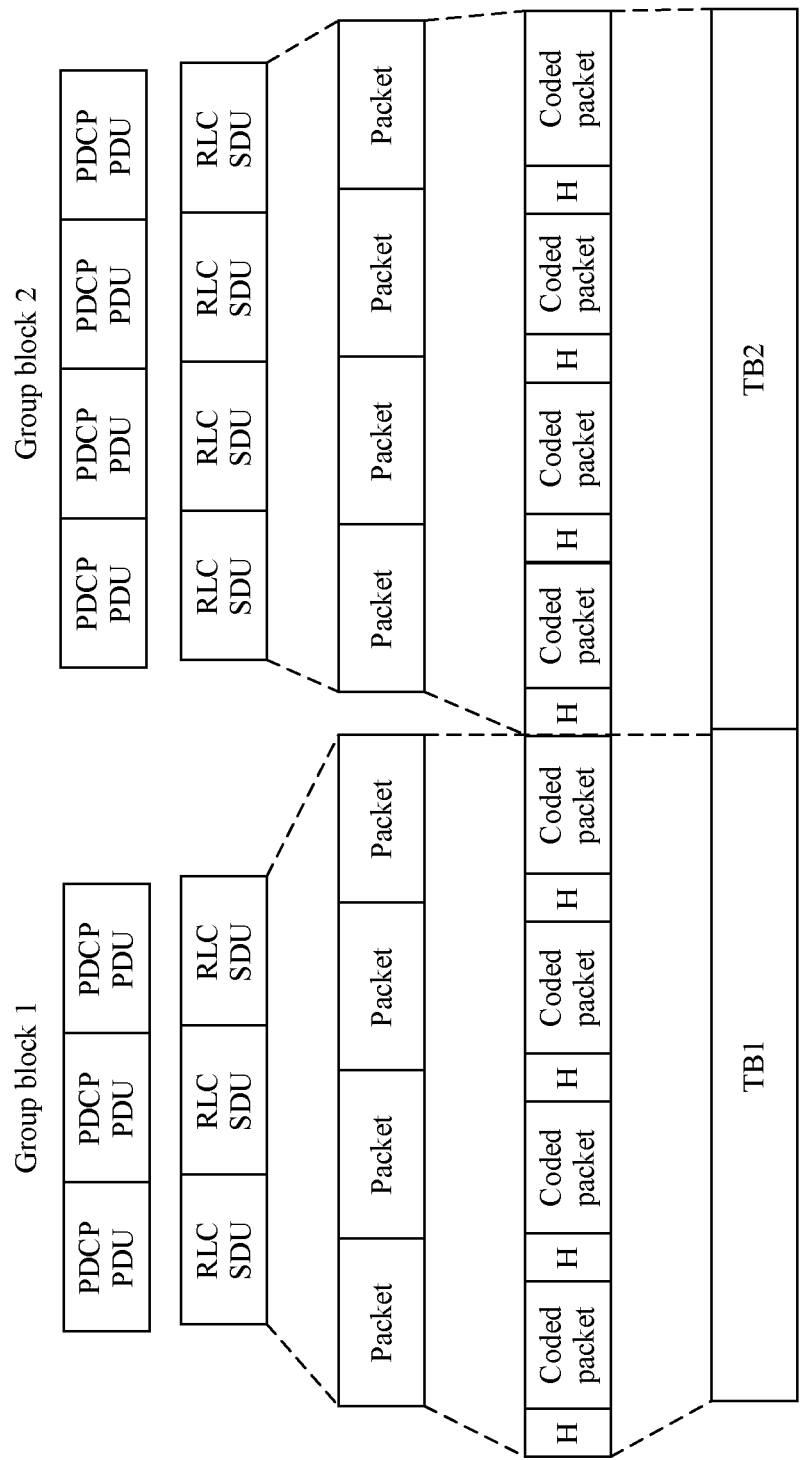
FIG. 4b is a schematic diagram of a coding method according to an embodiment of this disclosure.

As shown in FIG. 4b, for example, the NC layer is located at the RLC layer, the first module of the NC layer receives the second data unit (which may be the PDU of the PDCP layer herein) transmitted by the PDCP layer, and a data block includes three PDCP PDUs.

The to-be-coded data unit is generated based on the size of the to-be-coded data unit determined in step 401 and the second data unit. There may be a plurality of manners of generating the to-be-coded data unit. The following uses Manner a and Manner b as examples for description.

Manner a: The second data unit including header information of a protocol layer is adjusted based on the size of the to-be-coded data unit and the quantity M of to-be-coded data units, to generate the to-be-coded data unit.

The first module determines, based on a size L' of the coded data unit and the quantity M of to-be-coded data units, the second data unit (data received from an upper layer, for example, the first module is located at the RLC layer, which may be an SDU at the RLC layer herein) corresponding to the to-be-coded data unit.

Figure 4C:
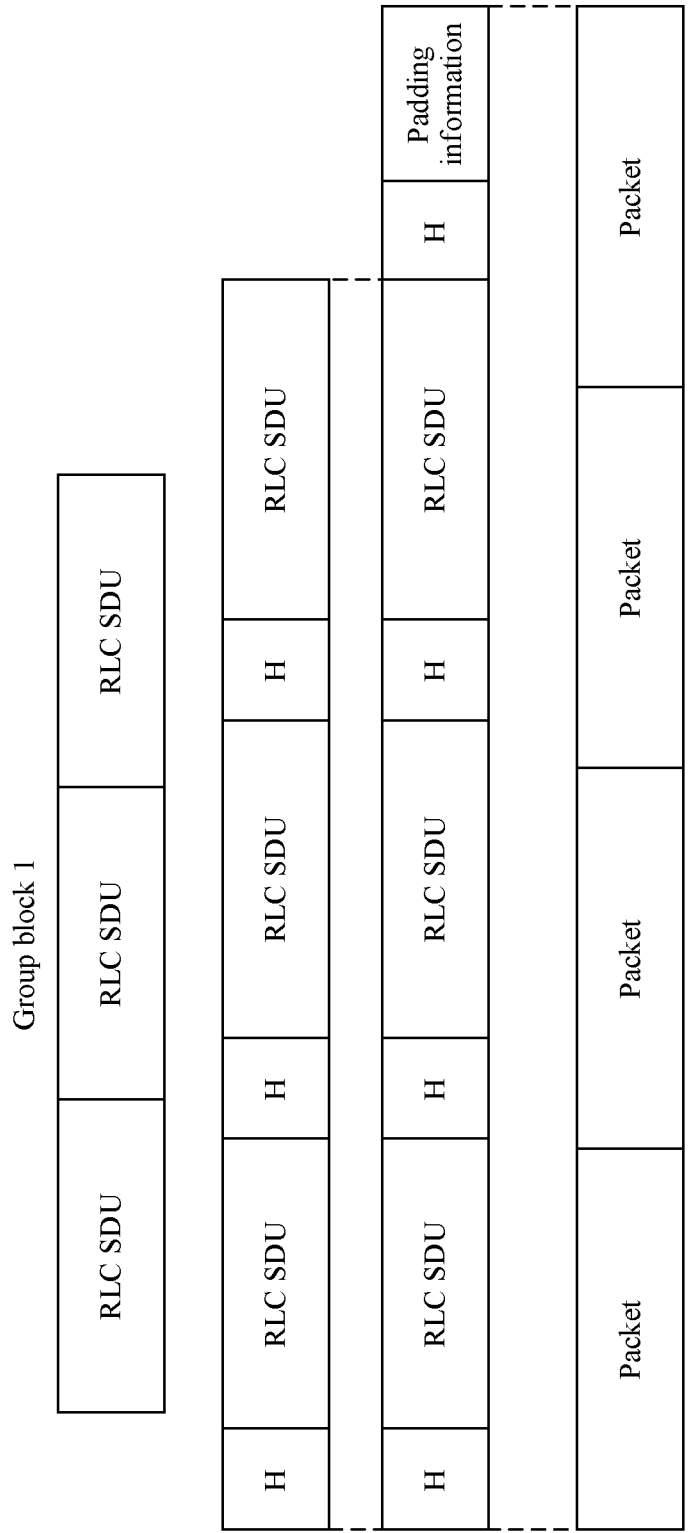
FIG. 4c and FIG. 4d are schematic diagrams of determining a to-be-coded data unit according to an embodiment of this disclosure.

In a possible implementation, header information of a protocol layer corresponding to the first module is added to the SDU obtained from the upper layer, to obtain a second data unit including a header. As shown in FIG. 4c, for example, if the first module is located at the RLC layer, the first module may add header information of the RLC layer to the SDU of the RLC layer obtained from the upper layer. The header information may include indication information indicating a size of the SDU at the RLC layer. This allows a decoder side to determine a size of the second data unit based on the header information of the RLC layer.

A size of the second data unit including the header information is compared with the size of the to-be-coded data unit, to determine whether operations such as combination or segmentation need to be performed on the second data unit, to generate M to-be-coded data units each with a size of L' based on the second data unit. It should be noted that the second data units in the following Manners a1 to a4 are all second data units including header information.

Manner a1: The first module determines that the size of the second data unit is equal to a total size of the M to-be-coded data units each with a size of L'. In this case, the second data unit may be equally segmented into the M to-be-coded data units each with a size of L'.

Manner a2: After the first module cascades (performs head-to-tail connection on) at least two second data units, a size of the at least two cascaded second data units is equal to a total size of the M to-be-coded data units each with a size of L'. In this case, the at least two second data units may be equally segmented into the M to-be-coded data units each with a size of L'.

Manner a3: If it is determined that a total size of M0 second data units (RLC SDU) including headers is less than M×L', in a possible implementation, a total size of (M0+1) second data units including headers is greater than M×L'. In this case, the M0 second data units may be used as a to-be-coded data block (object or block) by adding padding information (padding) to the M0 second data units, and the M0 second data units including both the headers and the padding information are equally segmented to obtain M to-be-coded data units each with a size of L' (that is, to generate the to-be-coded data block). A length of the padding information is determined based on a length of the second data unit, a length of the to-be-coded data unit, and a quantity of to-be-coded data units.

It is assumed that a length of the M0 second data units including headers is 150 bits, as shown in FIG. 4c, M0 is 3, and M is 4, that is, a total length of four to-be-coded data units (a to-be-coded data block) is 160 bits, a length of the padding information is 10 bits. After the padding information is added to the M0 second data units including headers, a length of the to-be-coded data block obtained is 160 bits, and the to-be-coded data block may be equally segmented into four to-be-coded data units. The padding information may include padding bits (for example, the padding bits each may be set to 0) and header information of the padding bits (the header information of the padding bits is optional). The padding information may be added to a tail of the M0 second data units, or may be added to a header of the M0 second data units, or may be added to a middle position of the M0 second data units. This is not limited herein.

In a possible implementation, if the total size of the M0+1 second data units including headers is greater than M×L', the M0 second data units including headers may be re-selected from to-be-sent second data units, to avoid excessive padding information being included in the to-be-coded data unit and a waste of transmission resources.

Manner a4: If it is determined that a total size of M_0 second data units including headers (RLC SDUs including headers) is greater than M×L', and a total size of M_0−1 second data units including headers is less than M×L', the last second data unit of the M_0 second data units may be segmented into a first segment unit and a second segment unit, and header information (for example, header information of the RLC layer) may be separately added to the first segment unit and the second segment unit, the M_0−1 second data units and the first segment unit are used as a to-be-coded data block (object or block), where a size of the to-be-coded data block is equal to M×L'. The second segment unit may be used as a new second data unit including a header, to be added to a subsequent to-be-coded data block.

Figure 4D:
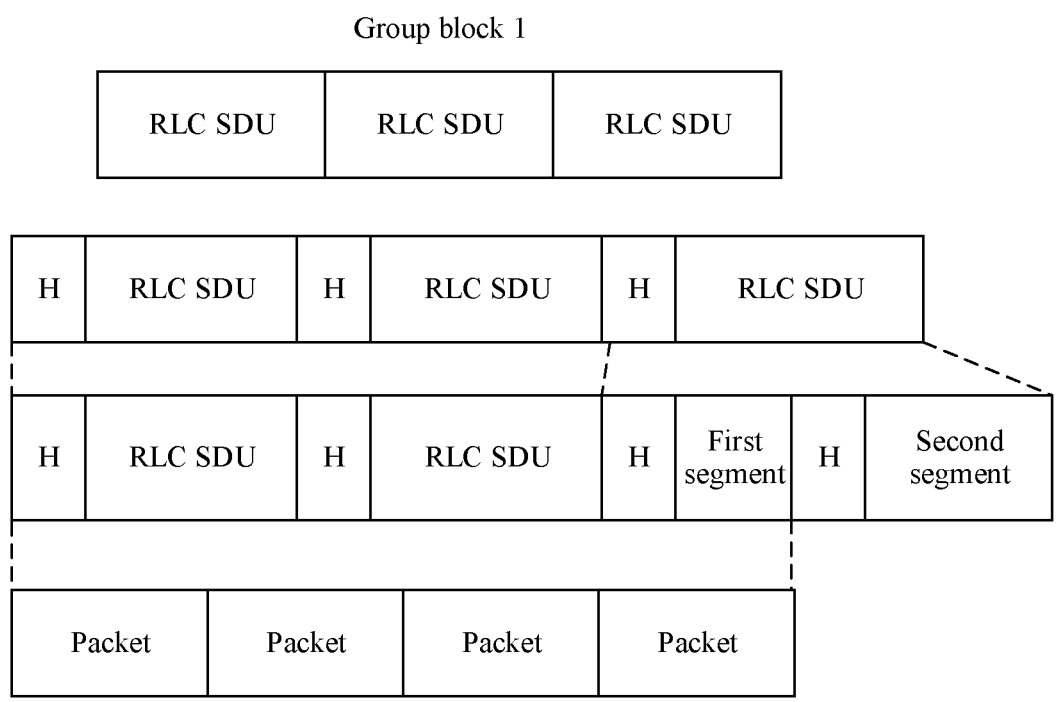

For example, as shown in FIG. 4d, in the M_0 second data units, M_0 is 3, a length of a second data unit is 30 bits, and a length of M×L' is 80 bits. After the three second data units are cascaded, the third second data unit may be segmented into a 20-bit first segment data unit and a 10-bit second segment data unit. The first segment data unit is a data unit including the header information of the RLC layer. Therefore, a total length of the first and second data units and the first segment data unit is 80 bits, which is equal to the length of M×L'. Therefore, the first and second data units and the first segment data unit may be equally segmented into four to-be-coded data units. In addition, the second segment data unit is a data unit not including the header information of the RLC layer. The header information of the RLC layer may be added to the second segment data unit, to be used as a new second data unit.

FIG. 4c and FIG. 4d show examples of equal segmentation. In this application, the segmentation may alternatively be unequal. For example, in Manner a3, the second data unit including the padding information may be directly used as the to-be-coded data unit.

Manner b: The second data unit is adjusted based on the size of the to-be-coded data unit and a quantity M of to-be-coded data units, to generate the to-be-coded data unit.

In a possible implementation, if the first module is located at a separate coding layer, the first module receives the second data unit from the upper layer. Before adjusting the second data unit, the first module may not add header information of a corresponding protocol layer. For example, the first module is located at a coding layer between the RLC layer and the PDCP layer. In this case, after receiving the second data unit of the PDCP layer (the PDU of the PDCP layer), the first module may adjust the second data unit based on a size L' of each of the M to-be-coded data units, compare a size of the second data unit with the size of each of the M to-be-coded data units, and determine whether operations such as combination or segmentation need to be performed on the second data unit, to generate the M to-be-coded data units each with a size of L'.

For a specific manner of determining the to-be-coded data unit, refer to Manner a1 to Manner a4. A difference lies in that the second data unit is a second data unit not including a header.

Step 403: Code the to-be-coded data unit to obtain the coded data unit.

In step 403, the first module may generate the coded data unit based on the to-be-coded data unit and a coding parameter.

The first module may code the M to-be-coded data units to generate N coded data units, to be specific, code (for example, perform network coding on) the M to-be-coded data units to obtain N coded data units $Y_1, Y_2, \ldots, Y_N$ (N≥M). A coding scheme may be predefined or configured by the network device. After the coded data unit is generated, header information of the coded data unit may be added to the coded data unit. For example, a header size of the coded data unit may be determined based on the coding scheme or the coding parameter.

There may be one or more of the following coding parameters: indication information (such as a block ID/group ID) of a data block, the quantity of coded data units, the size of the coded data unit, the first coding bit rate, the quantity of to-be-coded data units, the size of the to-be-coded data unit, and the like.

Optionally, the first device may send second indication information to the second device, to indicate the coding parameter, so that the second device decodes, based on the coding parameter indicated by the second indication information, the first data unit output by the first device. The indication information of the coding parameter may be sent via header information of the coded data unit, a control PDU of the coding layer (for example, the RLC layer), a MAC CE, or DCI of a physical layer. A specific coding parameter to be sent may be determined depending on an actual scenario.

For example, the second indication information indicates the quantity of coded data units.

In this way, the decoder side may determine the size of the coded data unit based on the quantity of coded data units and the size of the received first data unit in Manner A of determining the size of the to-be-coded data unit. Further, the coded data unit in the first data unit is decoded based on a preset coding scheme to obtain to-be-received data.

In another example, the second indication information indicates the quantity of to-be-coded data units and the first coding bit rate.

In this way, the decoder side may determine, in Manner B of determining the size of the to-be-coded data unit, the size of the coded data unit based on the quantity of to-be-coded data units, the first coding bit rate, and the size of the first data unit received by the decoder side. Further, the decoder side decodes the coded data unit in the first data unit based on a preset coding scheme to obtain to-be-received data.

In another example, the second indication information indicates the size of the to-be-coded data unit or the size of the coded data unit.

In this way, the decoder side may determine the quantity of coded data units based on the size of the coded data unit and the size of the received first data unit in Manner A of determining the size of the to-be-coded data unit. Alternatively, the decoder side may determine the quantity of to-be-coded data units based on the size of the to-be-coded data unit and the size of the received first data unit in Manner B of determining the size of the to-be-coded data unit. Further, the decoder side decodes the coded data unit in the first data unit based on a preset coding scheme to obtain to-be-received data.

Step 404: Generate the first data unit based on the coded data unit.

Step 405: Output the first data unit.

Manners of generating and outputting the first data unit may be determined depending on a scenario corresponding to the first data unit. The following uses Manner c1 and Manner c2 as examples for description.

If the first data unit is the TB in the current transmission opportunity, the first data unit may be generated in Manner c1.

Manner c1: The first module adds corresponding protocol layer header information to N coded data units to generate the first data unit, outputs the first data unit through at least one protocol layer, and finally sends the N coded data units to the receiving end via a TB at the physical layer.

If the first data unit is a PDU determined based on first indication information sent by the second module, the first data unit may be generated in Manner c2.

Manner c2: The first module uses N coded data units as the first data unit.

In this case, one of the N coded data units may be sent as a PDU, or the N coded data units may be concatenated and sent as a PDU to the second module.

According to the coding method provided in this embodiment of this application, a total size of the coded data units transmitted in a transmission opportunity can match the size of the TB transmitted in the current transmission opportunity. This reduces system resource overheads and improves spectral efficiency.

Figure 5A:
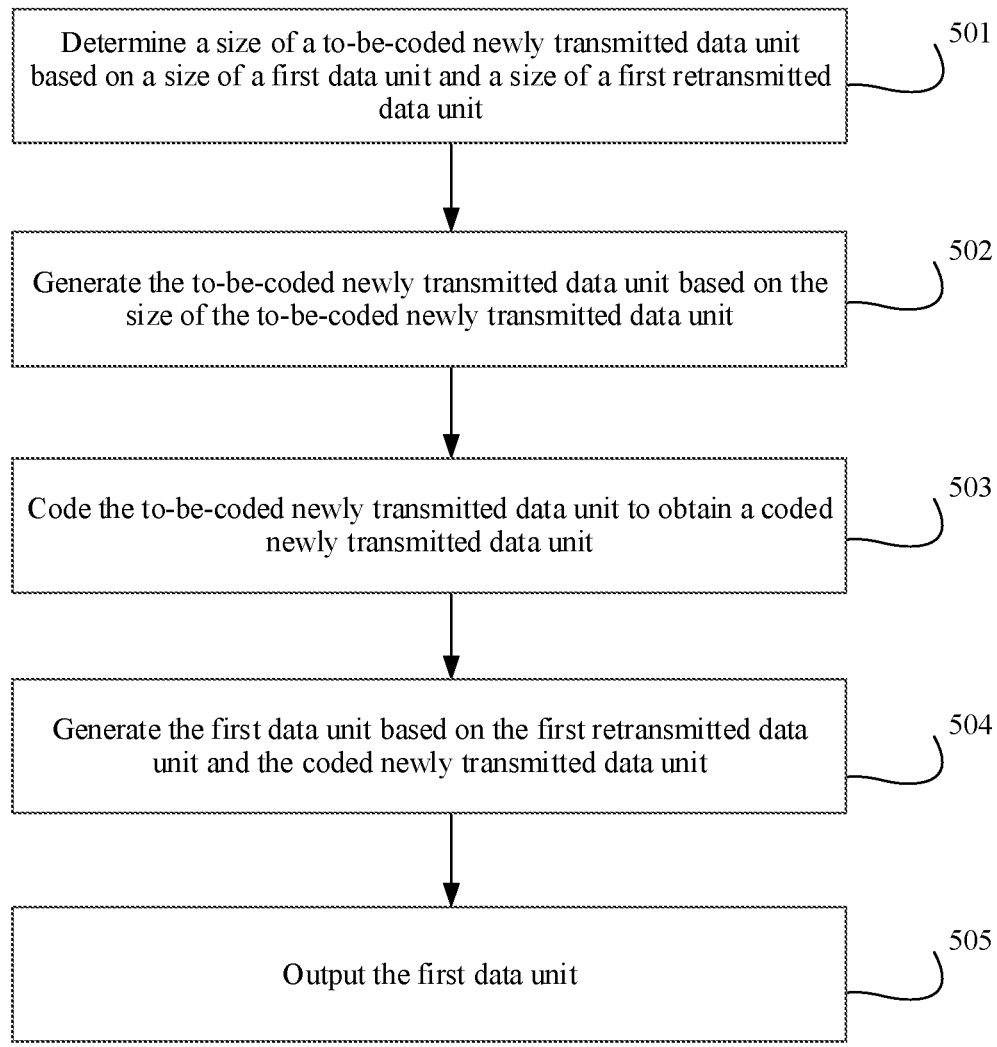
FIG. 5a is a schematic flowchart of a coding method according to an embodiment of this disclosure.

Further, an error or a loss in data unit transmission is inevitable due to impact of a radio channel between the transmitting end and the receiving end, or if the receiving end does not obtain, for transmission of a coded data block, a sufficient quantity of coded data units for decoding of the coded data block, decoding fails because an error or a loss occurs in the coded data unit, and the to-be-coded data unit cannot be restored. To ensure transmission reliability, the transmitting end needs to retransmit the to-be-coded data unit or the coded data block. In consideration of data retransmission, the TB in the current transmission opportunity may further carry a coded newly transmitted data unit and/or a coded retransmitted data unit. In this scenario, as shown in FIG. 5a, this application provides a coding method. For example, coding is performed by a first module of a first device. The first module may be the first module a of the first device in FIG. 3, and correspondingly, the first module may output the first data unit to a second module of the first device, or output the first data unit to a second module of a second device. This is not limited herein. For a manner in which coding is performed by the first module of the second device, refer to this embodiment. Details are not described herein. The following describes the solution in detail with reference to the accompanying drawings. The method specifically includes the following steps.

Step 501: Determine a size of a to-be-coded newly transmitted data unit based on a size of the first data unit and a size of a first retransmitted data unit.

The to-be-coded newly transmitted data unit may be a to-be-coded newly transmitted data unit included in the to-be-coded data unit in the implementation in FIG. 4a.

In the current transmission opportunity, data retransmission further needs to be performed. Therefore, in addition to the size of the first data unit, the size of the first retransmitted data unit also needs to be considered. The first retransmitted data unit may be determined based on a to-be-retransmitted data unit. Herein, the to-be-retransmitted data unit may be a to-be-coded data unit corresponding to a coded data block transmitted in a previous transmission opportunity, or may be a coded data unit corresponding to a coded data block transmitted in a previous transmission opportunity, or may be a to-be-coded data unit corresponding to a retransmitted coded data block, or may be a coded data unit in a retransmitted coded data block. For ease of the following description, the coded data blocks transmitted in transmission opportunities before the current transmission opportunity may be collectively referred to as to-be-retransmitted coded data blocks. The first retransmitted data unit may be determined in Manner C1 or Manner C2.

Manner C1: If a total size of to-be-retransmitted data units is greater than the size of the first data unit, the first retransmitted data unit may be determined based on the to-be-retransmitted data units, so that the size of the first retransmitted data unit is less than or equal to the size of the first data unit. For example, X to-be-retransmitted data units with a size of less than or equal to the size of the first data unit may be determined based on the size of the first data unit, and the X to-be-retransmitted data units are used as the first retransmitted data unit. Sizes of X data units may be the same or may be different. The X data units may all correspond to to-be-coded data units in the to-be-retransmitted coded data block; or may all correspond to coded data units in the to-be-retransmitted coded data block; or some of the X data units correspond to to-be-coded data units in the to-be-retransmitted coded data block, and the other correspond to coded data units in the to-be-retransmitted coded data block. After the X data units of the first retransmitted data unit are determined, the X data units may be coded based on a current coding scheme, or the X data units may be separately coded. This is not limited herein. For ease of description, the first retransmitted data unit mentioned below is a coded retransmitted data unit.

Manner C2: If a total size of to-be-retransmitted data units is less than or equal to the size of the first data unit, the to-be-retransmitted data unit is used as the first retransmitted data unit.

In conclusion, the X to-be-retransmitted data units that need to be retransmitted in the current transmission opportunity may be collectively referred to as the first retransmitted data unit, and a size of the first retransmitted data unit may be represented by S2. The first retransmitted data unit is finally sent to the second device (a receiving end) via a TB at a physical layer. The first retransmitted data unit may be a retransmitted data unit that is coded according to the coding method to which this embodiment of this application is applicable, or may be an uncoded retransmitted data unit. This is not limited herein. In a scenario in which the first retransmitted data unit is the coded retransmitted data unit, the first retransmitted data unit may be generated by coding the to-be-retransmitted data unit based on a current coding scheme, or the first retransmitted data unit may be generated by coding together with the to-be-coded data unit. This is not limited herein.

Considering that in Manner C2, newly transmitted data may be further transmitted while the first retransmitted data unit is transmitted, the to-be-coded newly transmitted data unit may be determined based on the size of the first data unit and the size of the first retransmitted data unit. In this embodiment of this application, there may be a plurality of manners of determining the size of the to-be-coded newly transmitted data unit. The following uses Manner D and Manner E as examples for description.

Manner D: The size of the to-be-coded newly transmitted data unit is determined based on the size of the first data unit, the size of the first retransmitted data unit, and a quantity of coded newly transmitted data units.

In a scenario of different first data units, the size of the to-be-coded newly transmitted data unit may be determined based on different first data units. The following uses Manners D1 and D2 as an example for description. When the first data unit is another data unit, refer to this example. Details are not described herein.

Manner D1: When the first data unit is a TB in the current transmission opportunity, a coded newly transmitted data block may further be transmitted on the TB in the current transmission opportunity, in addition to the first retransmitted data unit. The coded newly transmitted data block may include N1 coded newly transmitted data units. N1 may be a predefined value or a value configured by a network device, for example, N1=16. Therefore, a size of the coded newly transmitted data unit may be determined based on the first data unit, the first retransmitted data unit, and the quantity of coded newly transmitted data units, and the size of the to-be-coded newly transmitted data unit may accordingly be determined.

For example, a coded newly transmitted data block may be transmitted on the TB in the current transmission opportunity. A size of a TB obtained by removing the first retransmitted data unit corresponds to a size L1 of N1 coded newly transmitted data units with headers added. Therefore, the size L1 of the coded newly transmitted data units with headers added may satisfy:

$$\left\lceil \frac{S1-S2}{N1} \right\rceil, \text{ or } \left\lfloor \frac{S1-S2}{N1} \right\rfloor.$$

S2 represents the size of the first retransmitted data unit, and N1 represents the quantity of coded newly transmitted data units. Correspondingly, the size L1' of the to-be-coded newly transmitted data unit is obtained by subtracting a header size H1 of a coded data unit header from the size L1 of the coded newly transmitted data unit. Therefore, the size L1' of the to-be-coded newly transmitted data unit may satisfy:

$$\left\lceil \frac{S1-S2}{N1} \right\rceil - H1, \text{ or } \left\lfloor \frac{S1-S2}{N1} \right\rfloor - H1$$

H1 represents the header size of a coded data unit header of the coded newly transmitted data unit. For a manner of determining H1, refer to the manner of determining H. Details are not described herein again.

Manner D2: When the first data unit is a part of the TB in the current transmission opportunity, for example, K1 coded newly transmitted data blocks may be transmitted on the TB in the current transmission opportunity, a coded newly transmitted data block may include N1 coded newly transmitted data units, and a TB corresponds to K1×N1 coded newly transmitted data units with headers added. Therefore, the size L1 of the coded newly transmitted data unit with a header added may satisfy:

$$\left\lceil \frac{S1-S2}{K1 \times N1} \right\rceil, \text{ or } \left\lfloor \frac{S1-S2}{K1 \times N1} \right\rfloor.$$

Correspondingly, the size L1' of the to-be-coded newly transmitted data unit satisfies:

$$\left\lceil \frac{S1-S2}{K1 \times N1} \right\rceil - H1, \text{ or } \left\lfloor \frac{S1-S2}{K1 \times N1} \right\rfloor - H1$$

In another scenario in which the first data unit is a different data unit, for a possible implementation of determining the to-be-coded newly transmitted data unit, refer to Manner A3 to Manner A5. Details are not described herein again.

Manner E: The size of the to-be-coded newly transmitted data unit is determined based on the size of the first data unit, the size of the first retransmitted data unit, and a quantity of to-be-coded newly transmitted data units. In a scenario of different first data units, the size of the to-be-coded data unit may be determined based on different first data units. The following uses Manner E1 as an example for description. When the first data unit is another data unit, refer to this example. Details are not described herein.

Manner E1: When the first data unit is the TB in the current transmission opportunity, it is assumed that a coded newly transmitted data block may further be transmitted on the TB in the current transmission opportunity, in addition to the first retransmitted data unit. The coded newly transmitted data block may include N1 coded newly transmitted data units, and a to-be-coded data block may include M1 to-be-coded newly transmitted data units. M1 herein may be a predefined value or a value configured by a network device, for example, M1=8. M1 may alternatively be determined based on a quantity N of coded newly transmitted data units. Because a to-be-coded newly transmitted data unit in a to-be-coded newly transmitted data block needs to be coded to generate a coded newly transmitted data unit, in a coding process, a quantity N of coded newly transmitted data units included in the coded newly transmitted data block may be determined based on a coding bit rate R1. The coding bit rate is a ratio M1/N1 of the quantity of to-be-coded newly transmitted data units to the quantity of coded newly transmitted data units, and R1 may also be referred to as a second coding bit rate. The coding bit rate may be determined depending on an actual requirement. For example, the coding bit rate may be determined based on a loss rate or an error rate of a coded data unit sent by a transmitting end to a receiving end. For example, the quantity M1 of to-be-coded newly transmitted data units is obtained based on the quantity N1 of coded newly transmitted data units corresponding to the coded newly transmitted data block and the second coding bit rate R1. M1 satisfies M1=$\lfloor$N1×R1$\rfloor$ or M1=$\lceil$N1×R1$\rceil$, $\lfloor \cdot \rfloor$ represents rounding down, and $\lceil \cdot \rceil$ represents rounding up.

For example, a size L1 of the coded newly transmitted data unit with a header added satisfies:

$$\left\lceil \frac{S1-S2}{\frac{M1}{R1}} \right\rceil, \text{ or } \left\lfloor \frac{S1-S2}{M1/R1} \right\rfloor.$$

S1 represents the size of the first data unit, M1 represents a quantity of to-be-coded data units, R1 represents the second coding bit rate, $\lfloor \cdot \rfloor$ represents rounding down, and $\lceil \cdot \rceil$ represents rounding up. The second coding bit rate is a coding bit rate used for the to-be-coded newly transmitted data unit.

Accordingly, a size L1' of the to-be-coded newly transmitted data unit is obtained by subtracting the header size from L1, that is, L1'=L1−H1. For a manner of determining the header size H1, refer to the determining manner in Manner D. Details are not described herein again. Therefore, in a possible implementation, the size of the to-be-coded newly transmitted data unit satisfies:

$$\left\lceil \frac{S1-S2}{\frac{M1}{R1}} \right\rceil - H1, \text{ or } \left\lfloor \frac{S1-S2}{M1/R1} \right\rfloor - H1$$

H1 represents the header size of the coded newly transmitted data unit.

In another scenario in which the first data unit is a different data unit, for a possible implementation of determining the to-be-coded newly transmitted data unit, refer to Manner B2 to Manner B5. Details are not described herein again.

Further, to improve transmission performance, this embodiment of this application provides another manner of determining the to-be-coded newly transmitted data unit. The following uses Manner F and Manner G as examples for description.

Manner F: The to-be-coded newly transmitted data unit satisfies at least one of the following:
the size of the to-be-coded newly transmitted data unit satisfies a first condition, and a quantity of to-be-coded newly transmitted data units satisfies a second condition.

The first condition and the second condition may be predefined or configured by a network device. Conditions that need to be satisfied by the to-be-coded newly transmitted data unit in different scenarios are specifically described below in Manner F1 to Manner F3.

Manner F1: The size of the to-be-coded newly transmitted data unit satisfies the first condition. The first condition is that the size of the to-be-coded newly transmitted data unit is less than or equal to a first threshold; or the first condition is that the size of the to-be-coded newly transmitted data unit falls within a first value range.

For example, the first threshold or the first value range may be determined based on a size of a code block (CB) that may be transmitted on a TB in the current transmission opportunity. For example, the first threshold may be set to a size of two CBs. The first value range may be set to $[C_1, C_2]$. $C_1$ and $C_2$ may be determined as required. This is not limited herein.

Manner F2: The quantity of to-be-coded newly transmitted data units satisfies the second condition. The second condition is that the quantity of to-be-coded newly transmitted data units is less than or equal to a second threshold; or the second condition is that the quantity of to-be-coded newly transmitted data units falls within a second value range.

For example, the second threshold or the second value range may be determined based on a size of a CB that may be transmitted on a TB in the current transmission opportunity. For example, the second threshold may be set to twice a quantity of CBs in a TB.

Manner F3: If the to-be-coded newly transmitted data unit needs to satisfy both the first condition and the second condition, priorities may be further set for the first condition and the second condition, and a condition with a higher priority is preferentially satisfied.

For example, a priority of the first condition is higher than a priority of the second condition. If the first condition and the second condition cannot be both satisfied, the first condition may be preferentially satisfied, and the second condition may not be satisfied.

Manner G: The coded newly transmitted data unit satisfies at least one of the following:
 a size of the coded newly transmitted data unit satisfies a third condition, and a quantity of coded newly transmitted data units satisfies a fourth condition.

Conditions to be satisfied by the coded newly transmitted data unit in different scenarios are specifically described below in Manner G1 to Manner G3.

Manner G1: The size of the coded newly transmitted data unit satisfies the third condition. The third condition is that the size of the coded newly transmitted data unit is less than or equal to a third threshold; or the third condition is that the size of the coded newly transmitted data unit falls within a third value range.

For example, the third threshold or the third value range may be determined based on a size of a CB that may be transmitted on a TB in the current transmission opportunity. For example, the third threshold may be set to a size of two CBs. The third value range may be set to $[O_1, O_2]$. $O_1$ and $O_2$ may be determined as required. This is not limited herein.

Manner G2: The size of the coded newly transmitted data unit satisfies the fourth condition. The fourth condition is that the quantity of coded newly transmitted data units is less than or equal to a fourth threshold; or the fourth condition is that the quantity of coded newly transmitted data units falls within a fourth value range.

For example, the fourth threshold or the fourth value range may be determined based on a size of a CB that may be transmitted on a TB in the current transmission opportunity. For example, the fourth threshold may be set to twice a quantity of CBs in a TB.

Manner G3: If the coded newly transmitted data unit needs to satisfy both the third condition and the fourth condition, priorities may be further set for the third condition and the fourth condition, and a condition with a higher priority is preferentially satisfied.

For a specific implementation, refer to the foregoing Manner F3. Details are not described herein again.

For the foregoing manners, the first module determines the size of the to-be-coded newly transmitted data unit or the size of the coded newly transmitted data unit based on the first data unit and the condition that the to-be-coded newly transmitted data unit or the coded newly transmitted data unit needs to satisfy, to effectively control a quantity of newly transmitted data units generated in the current transmission opportunity while ensuring that a total size of the coded data units transmitted in a transmission opportunity can match the size of the TB. This reduces coding and decoding complexity and improves data transmission performance. Alternatively, in a case of different channel quality, a quantity of generated newly transmitted data units or a size of a single newly transmitted data unit is controlled. This improves data transmission performance.

Step 502: Generate the to-be-coded newly transmitted data unit based on the size of the to-be-coded newly transmitted data unit.

In this case, the first module may obtain a fourth data unit, where data in the fourth data unit may be to-be-output newly transmitted data determined by the first module, so that the first module may determine the to-be-coded newly transmitted data unit based on the size of the to-be-coded newly transmitted data unit and the fourth data unit.

Specifically, for determining the to-be-coded newly transmitted data unit based on the size of the to-be-coded newly transmitted data unit and the fourth data unit, refer to the manner of generating the to-be-coded data unit based on the second data unit and the size of the to-be-coded data unit in step 402. Details are not described herein again.

Step 503: Code the to-be-coded newly transmitted data unit to obtain the coded newly transmitted data unit.

In step 503, the coded newly transmitted data unit may be generated based on the to-be-coded newly transmitted data unit and a coding parameter.

Network coding is performed on M1 to-be-coded data units to obtain N1 coded data units $Y_1, Y_2, \ldots, Y_{N1}$ (N1≥M1), where a coding scheme used may be predefined or configured by the network device. After the coded data unit is generated, header information of the coded data unit may be added to the coded data unit. For a specific manner of generating the coded newly transmitted data unit, refer to the manner of generating the coded newly transmitted data unit in step 403. Details are not described herein again.

One or more of the following generated coding parameters may be used: the size of the first retransmitted data unit, a coding scheme of the first retransmitted data unit, an identifier (such as a block ID/group ID) of the coded newly transmitted data block, the quantity of coded newly transmitted data units, the size of the coded newly transmitted data unit, the second coding bit rate, the quantity of to-be-coded newly transmitted data units, the size of the to-be-coded newly transmitted data unit, and the like.

Optionally, the first device may send third indication information to the second device, to indicate the coding parameter, so that the second device decodes, based on the coding parameter indicated by the third indication information, the coded data unit and the first retransmitted data unit that are in the first data unit output by the first device. A specific coding parameter to be sent may be determined depending on an actual scenario.

For example, the third indication information indicates the quantity of coded newly transmitted data units. In this case, a decoder side may determine the size of the coded newly transmitted data unit in Manner D of determining the size of the to-be-coded newly transmitted data unit based on the quantity of coded newly transmitted data units, the size of the received first data unit, and the size of the first retransmitted data unit. Further, the coded newly transmitted data unit in the first data unit is decoded based on a preset coding scheme to obtain to-be-received newly transmitted data.

In another example, the third indication information indicates the quantity of to-be-coded newly transmitted data units and the second coding bit rate. In this case, the decoder side may determine, in Manner E of determining the size of the to-be-coded newly transmitted data unit, the size of the coded newly transmitted data unit based on the quantity of to-be-coded newly transmitted data units, the second coding bit rate, and the size of the first data unit received by the decoder side. Further, the coded newly transmitted data unit in the first data unit is decoded based on a preset coding scheme to obtain to-be-received newly transmitted data.

In still another example, the third indication information indicates the size of the to-be-coded newly transmitted data unit or the size of the coded newly transmitted data unit.

In this case, the decoder side may determine, in Manner D of determining the size of the to-be-coded newly transmitted data unit, the quantity of coded newly transmitted data units based on the size of the coded newly transmitted data unit, the size of the received first data unit, and the size of the first retransmitted data unit. Alternatively, the decoder side may determine, in Manner E of determining the size of the to-be-coded newly transmitted data unit, the quantity of to-be-coded newly transmitted data units based on the size of the to-be-coded newly transmitted data unit, the size of the received first data unit, and the size of the first retransmitted data unit. Further, the coded newly transmitted data unit in the first data unit is decoded based on a preset coding scheme to obtain to-be-received newly transmitted data.

In addition, for the first retransmitted data unit, the receiving end may decode the first retransmitted data unit based on the size of the first retransmitted data unit and the coding scheme of the first retransmitted data unit, and also decode the decoded first retransmitted data unit and corresponding newly transmitted data, to improve performance of receiving the corresponding newly transmitted data.

Step 504: Generate the first data unit based on the coded newly transmitted data unit and the first retransmitted data unit.

Step 505: Output the first data unit.

In step 504, the first module may send the first retransmitted data unit and the coded newly transmitted data unit in the current transmission opportunity.

Figure 5B:
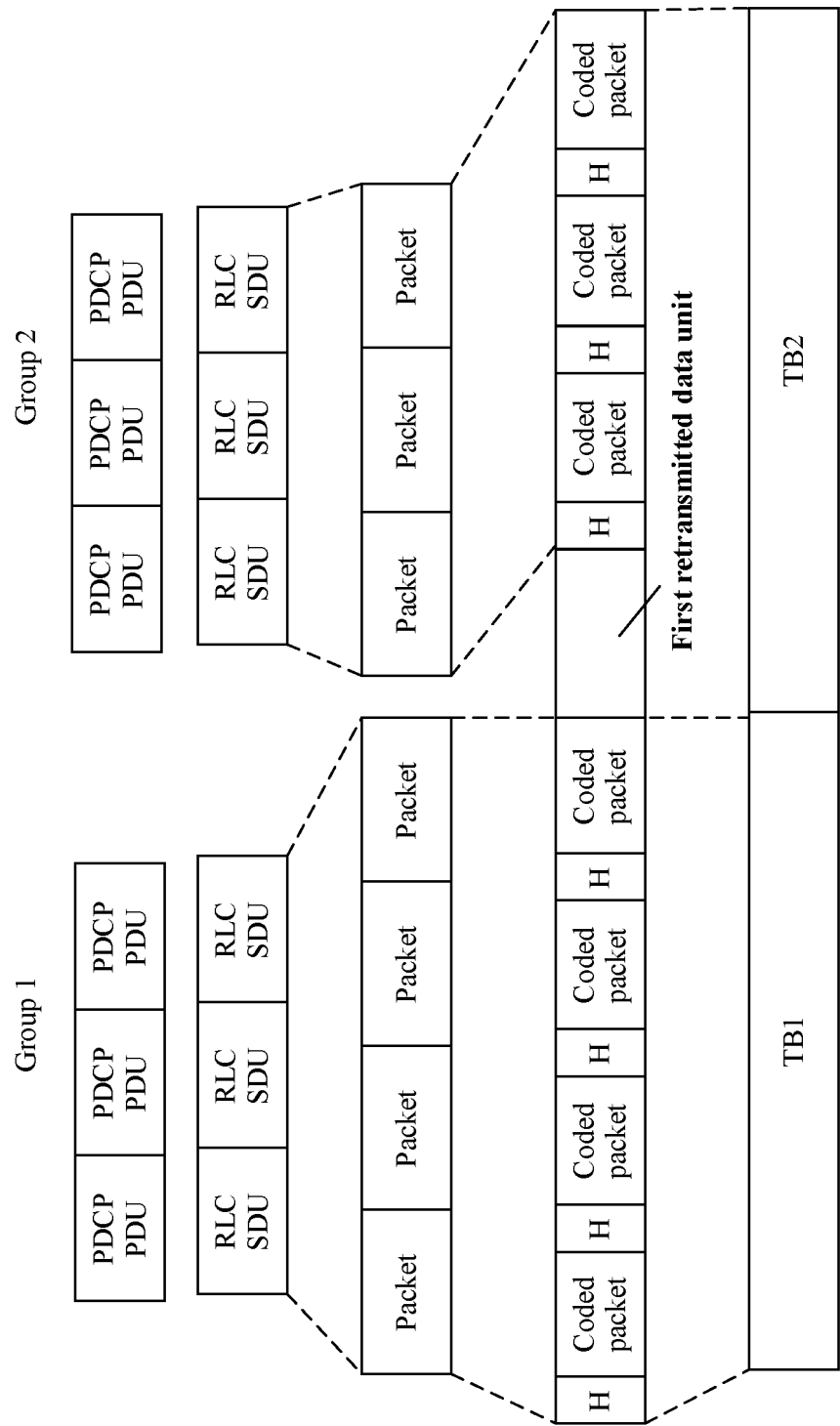
FIG. 5b is a schematic diagram of a coding method according to an embodiment of this disclosure.

As shown in FIG. 5*b*, the first retransmitted data unit includes X data units of a retransmitted coded data block, and the coded newly transmitted data units include N1 coded newly transmitted data units. During transmission, one of the X+N1 data units may be sent as a PDU, or the X+N1 data units may be concatenated as a PDU and sent to the second module. Finally, the X+N1 data units may be sent to the receiving end via a TB at a physical layer.

In this embodiment, a to-be-retransmitted data unit in a current transmission opportunity is further considered for transmission of a coded data unit in hybrid retransmission, so that a total size of coded newly transmitted data units transmitted in a transmission opportunity and a to-be-retransmitted data unit can match the size of the TB determined in the current transmission opportunity. This effectively improves spectrum utilization.

Figure 6A:
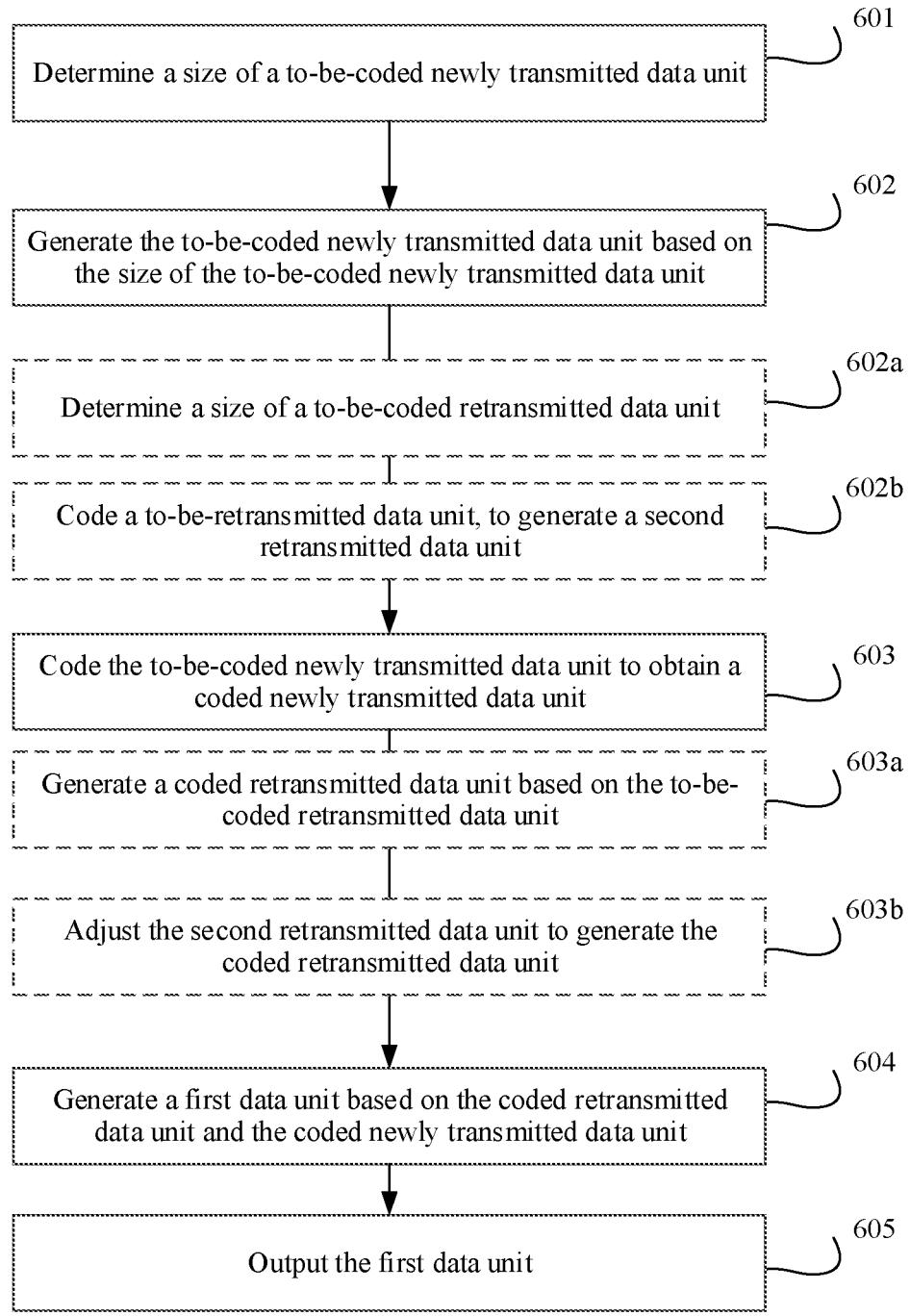
FIG. 6a is a schematic flowchart of a coding method according to an embodiment of this disclosure.

Considering a scenario in which retransmitted data and newly transmitted data need to be transmitted in the current transmission opportunity, to improve coding performance, as shown in FIG. 6*a*, embodiments of this disclosure further provide a coding method. For example, coding is performed by a first module of a first device, and the first module may be the first module a of the first device in FIG. 3. For a manner in which coding is performed by a first module of a second device, refer to this embodiment. Details are not described herein. Features or content denoted by dashed lines in the figure may be understood as optional operations or optional structures in this embodiment of this application. The method specifically includes the following steps.

Step 601: Determine a size of a to-be-coded newly transmitted data unit based on a size of a first data unit and a total size of to-be-coded retransmitted data units.

The to-be-coded newly transmitted data unit may be the to-be-coded newly transmitted data unit included in the to-be-coded data unit in the implementation in FIG. 4*a*. The to-be-coded retransmitted data unit may be the to-be-retransmitted data unit in the implementation in FIG. 5*a*.

The to-be-retransmitted data unit in the implementation in FIG. 5*a* is still used as an example. When it is determined that a total size of to-be-retransmitted data units that need to be transmitted in a current transmission opportunity is less than the size of the first data unit, it is determined that a newly transmitted data unit may also be transmitted in the current transmission opportunity. In this case, a size of a coded newly transmitted data unit that can be transmitted in the current transmission opportunity may be determined based on the total size of the to-be-retransmitted data units that need to be transmitted in the current transmission opportunity and the size of the first data unit. For a specific determining manner, refer to the implementations in Manner D and Manner E. Details are not described herein again.

For example, if the total size of the to-be-retransmitted data units in the current transmission opportunity is S3, and if the first data unit is a TB in the current transmission opportunity, a coded newly transmitted data block may be further transmitted on the TB in the current transmission opportunity, in addition to a to-be-retransmitted retransmitted data unit. The coded newly transmitted data block may include N2 coded newly transmitted data units, and N2 may be a value predefined or configured by a network device, for example, N2=16. Therefore, the size of the coded newly transmitted data unit may be determined based on the first data unit, the to-be-retransmitted data unit, and the quantity of coded newly transmitted data units, and the size of the to-be-coded newly transmitted data unit may accordingly be determined. Therefore, a size L2 of the coded newly transmitted data unit with a header added may satisfy:

$$\left\lceil \frac{S1-S3}{N2} \right\rceil, \text{ or } \left\lfloor \frac{S1-S3}{N2} \right\rfloor.$$

S3 represents the size of a coded retransmitted data unit, and N2 represents the quantity of coded newly transmitted data units. Correspondingly, a size L2' of the to-be-coded newly transmitted data unit is obtained by subtracting a header size H2 of a coded data unit header from the size L2 of the coded newly transmitted data unit. For a manner of determining H2, refer to the manner of determining H1. Details are not described herein again. Therefore, the size L2' of the to-be-coded newly transmitted data unit may satisfy:

$$\left\lceil \frac{S1-S3}{N2} \right\rceil - H2, \text{ or } \left\lfloor \frac{S1-S3}{N2} \right\rfloor - H2$$

H2 represents the header size of the coded data unit header of the coded newly transmitted data unit.

Step 602: Generate the to-be-coded newly transmitted data unit based on the size of the to-be-coded newly transmitted data unit.

Sizes and a quantity of retransmitted coded data units are adjusted based on coding of a coded newly transmitted data block or a size of the to-be-coded data unit, or a retransmitted coded data unit is generated for an adjusted to-be-coded data unit after sizes and a quantity of to-be-coded data units of a retransmitted coded data block are adjusted, or an adjusted to-be-coded data unit and a to-be-coded data unit of a coded newly transmitted data block are coded to generate a retransmitted coded data unit.

Step 603: Generate the coded newly transmitted data unit based on the to-be-coded newly transmitted data unit.

Hybrid coding may be performed on the to-be-retransmitted data unit and the newly transmitted data unit in a plurality of manners. The following uses Manner H1 and Manner H2 as examples for description.

Manner H1 may include the following optional steps 602a to 603a.

Step 602a: Determine a size of the to-be-coded retransmitted data unit based on the size of the to-be-coded newly transmitted data unit and the total size of the to-be-retransmitted data units.

In a possible implementation, the first module may use the size L2' of the to-be-coded newly transmitted data unit as the size of the to-be-coded retransmitted data unit. In this case, the quantity of to-be-coded retransmitted data units may be determined based on the total size of the to-be-retransmitted data units and the size of the to-be-coded retransmitted data unit. In addition, the to-be-retransmitted data units are divided based on the size of the to-be-coded retransmitted data unit, to obtain a corresponding quantity of to-be-coded retransmitted data units.

In another possible implementation, similar to Manner a3, the to-be-retransmitted data unit is equally divided into a plurality of segments, each with a size of L2', based on the size L2' of the to-be-coded newly transmitted data unit. If a size of a last segment is less than L2', padding information (for example, padding bits (all '0')) may be added to the last segment, to make the size of the last segment being L2'. In this way, one segment is used as a to-be-coded retransmitted data unit.

In still another possible implementation, similar to Manner a4, the to-be-retransmitted data unit may be equally divided into a plurality of segments, each with a size of L2', based on the size L2' of the to-be-coded newly transmitted data unit. If a size of a last segment is greater than L2', the last segment may be segmented into two parts, where the first segment part (with a size of L2') is used as a to-be-coded retransmitted data unit for the current time, and the other part is used as a to-be-retransmitted data unit for the next time.

Step 603a: Code the to-be-coded newly transmitted data unit and the to-be-coded retransmitted data unit to obtain the coded newly transmitted data unit and the coded retransmitted data unit.

Figure 6B:
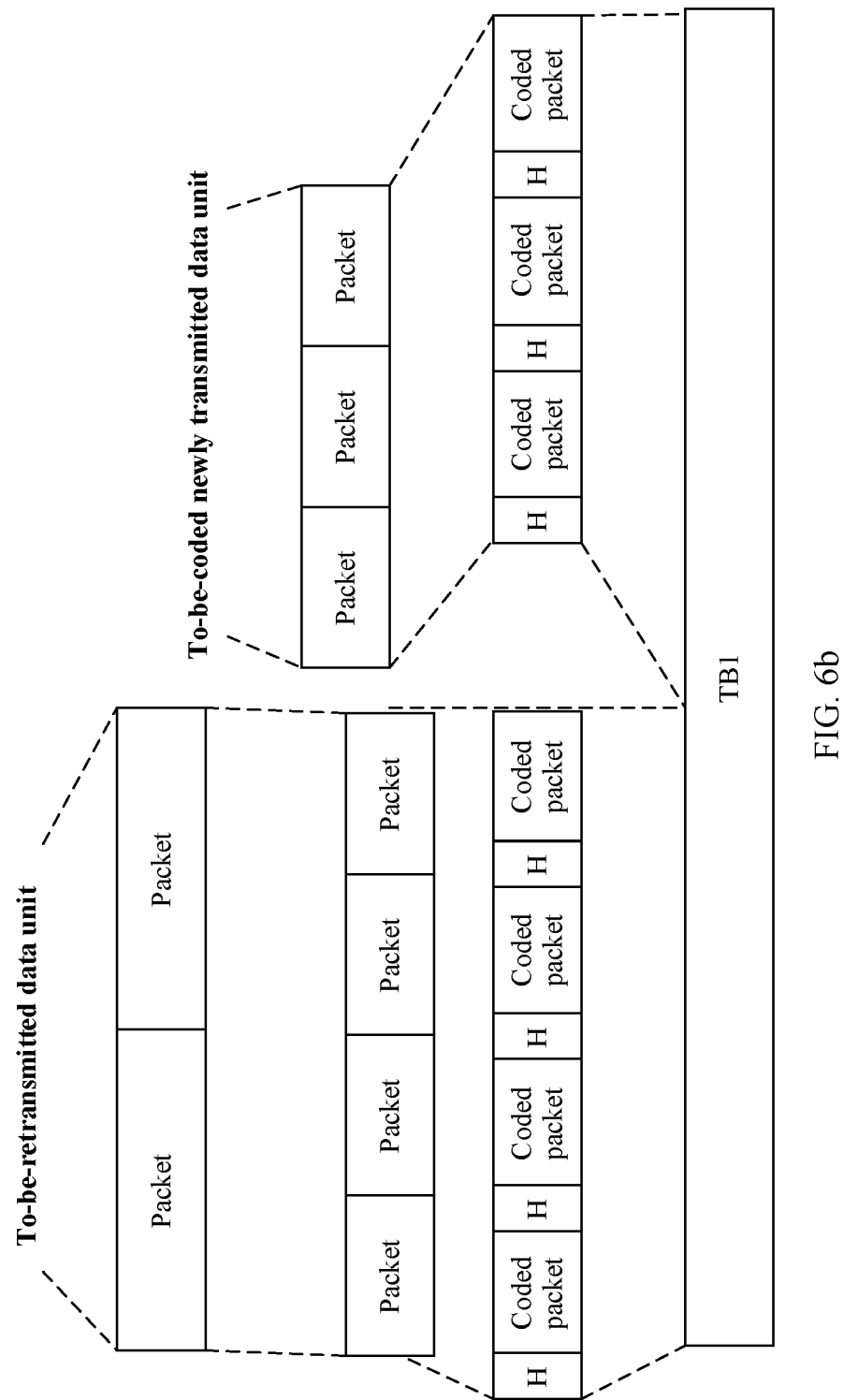
FIG. 6b is a schematic diagram of a coding method according to an embodiment of this disclosure.

In a possible implementation, as shown in FIG. 6b, it is assumed that $X_0$ to-be-coded retransmitted data units (a size of a to-be-coded retransmitted data unit may be L2') in the to-be-retransmitted data unit need to be retransmitted, for the to-be-retransmitted data unit, the to-be-coded retransmitted data unit is coded in the manner of step 602a to generate X1 coded retransmitted data units (a size of a coded retransmitted data unit not including header information may be L2').

In another possible implementation, step 603a may be performed simultaneously with step 603, to code the to-be-coded retransmitted data unit and the to-be-coded newly transmitted data unit together to generate X1 coded retransmitted data units and N2 coded newly transmitted data units. Header information of the coded data unit may be separately added to the coded newly transmitted data unit and the coded retransmitted data unit. A size of a coded retransmitted data unit including the header information may be L2, and (X1+N2)×L2 corresponds to the size of the first data unit. For a specific method for adding the header information of the coded data unit, refer to the embodiments in FIG. 4a and FIG. 5a. Details are not described herein again.

Manner H2 may include the following optional steps 602b to 603b.

Step 602b: Code the to-be-retransmitted data unit, to obtain a coded data unit as a second retransmitted data unit.

Figure 6C:
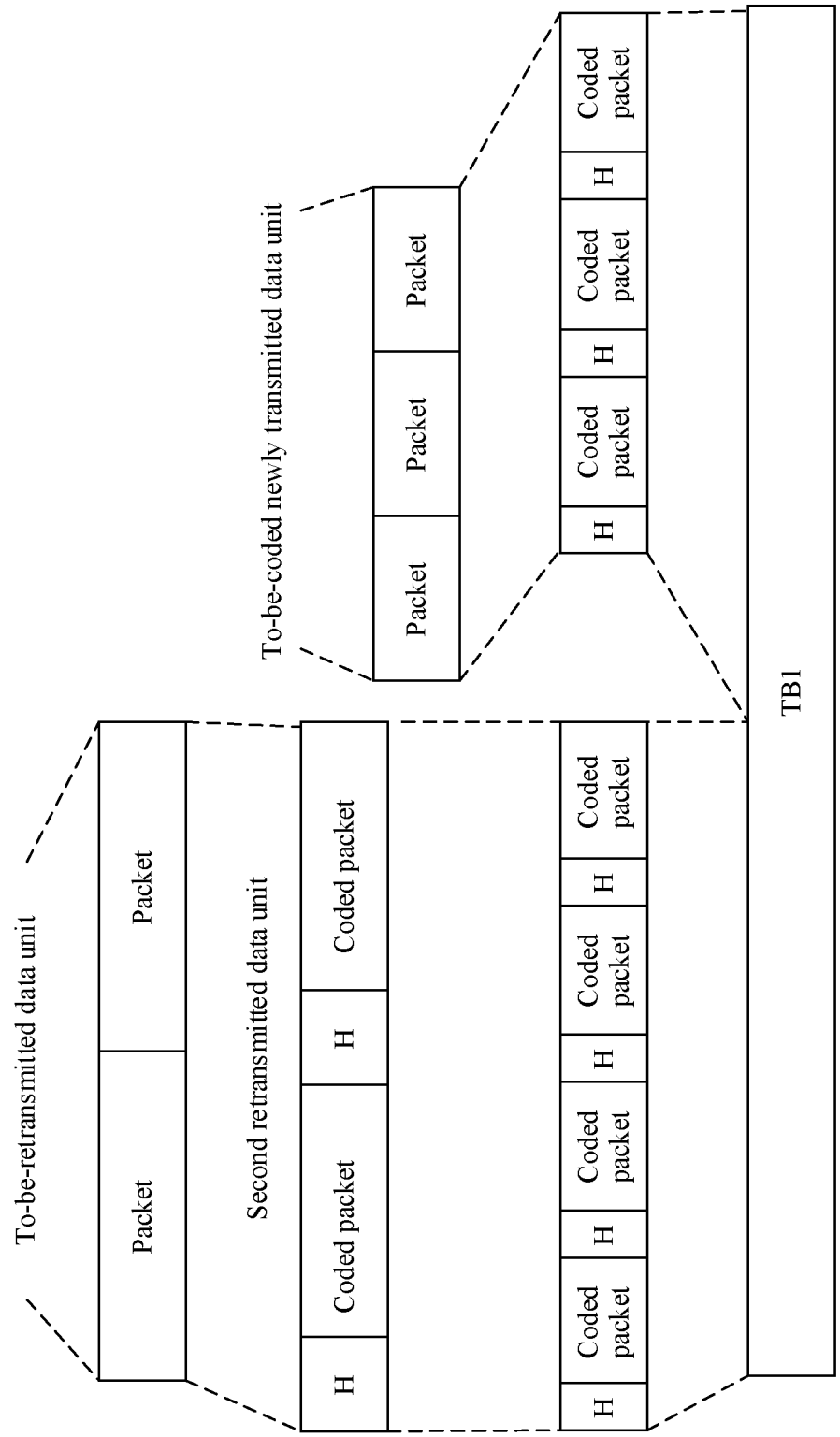
FIG. 6c is a schematic diagram of determining a to-be-coded data unit according to an embodiment of this disclosure.

As shown in FIG. 6c, it is assumed that the to-be-retransmitted data unit includes X2 data units each with a size of L0, the first module may code the to-be-retransmitted data unit to generate X0 coded data units each with a size of L0. In this case, the first module may use the X0 coded data units each with a size of L0 as the second retransmitted data unit.

Step 603b: Adjust the coded second retransmitted data unit based on the size of the coded newly transmitted data unit, to generate a coded retransmitted data unit with a same size as the size of the coded newly transmitted data unit.

In this case, the first module may divide, based on the size L2' of the to-be-coded newly transmitted data unit or the size L2 of the coded data unit, the second retransmitted data unit into a plurality of coded data units each with a size of L2.

As shown in FIG. 6c, the first module may divide, based on the size L2 of the coded newly transmitted data unit, the X0 coded retransmitted data units each with a size of L0 into X1 segments, where a size of a segment is L2.

In a possible implementation, if a size of a last segment is less than L1, padding information may be added to the last segment, to make the size of each segment being L2, and a segment is used as a coded retransmitted data unit. X1×L2≥X0×L0, and X0×L0≥(X1−1)×L2.

In another possible implementation, if a size of a last segment is greater than L2, the last segment may be segmented into a first segment part and a second segment part, to make a size of the first segment part being L2, and X1 segments are used as coded retransmitted data units. (X1+1)×L2≥X0×L0, and X0×L0≥X1×L2.

Step 604: Generate the first data unit based on the coded newly transmitted data unit and the coded retransmitted data unit.

Step 605: Output the first data unit.

In a possible implementation, the X1 coded retransmitted data units and the N1 coded newly transmitted data units are sent in the current transmission opportunity. In this case, one of the X1+N2 data units may be sent as a PDU, or X1+N2 data units may be concatenated as a PDU and sent to the second module. Finally, the X1+N2 data units are sent to a receiving end via a TB at a physical layer.

Optionally, the first module may further send coding parameters related to the retransmitted and coded newly transmitted data blocks to the receiving end via fourth indication information (for example, a control message).

There may be one or more of the following coding parameters: indication information (for example, a block ID/group ID) of a coded retransmitted data block, a quantity of to-be-retransmitted data units, indication information (for example, a block ID/group ID) of the coded newly transmitted data block, the quantity of coded newly transmitted data units, the size of the coded newly transmitted data unit, a second coding bit rate, a quantity of to-be-coded newly transmitted data units, the size of the to-be-coded newly transmitted data unit, and the like.

For example, the fourth indication information may indicate the quantity of to-be-coded retransmitted data units and a coding bit rate, or the fourth indication information indicates the quantity of coded retransmitted data units, or the fourth indication information indicates the size of the to-be-coded retransmitted data unit or the size of the coded retransmitted data unit.

According to the foregoing embodiment, a total size of coded data units transmitted in a transmission opportunity may match a size of a TB determined according to a protocol design, and a data unit of a retransmitted coded data block and a data unit of a coded newly transmitted data block may be coded in a hybrid manner. This improves a coding gain and further improves system spectral efficiency.

Figure 7:
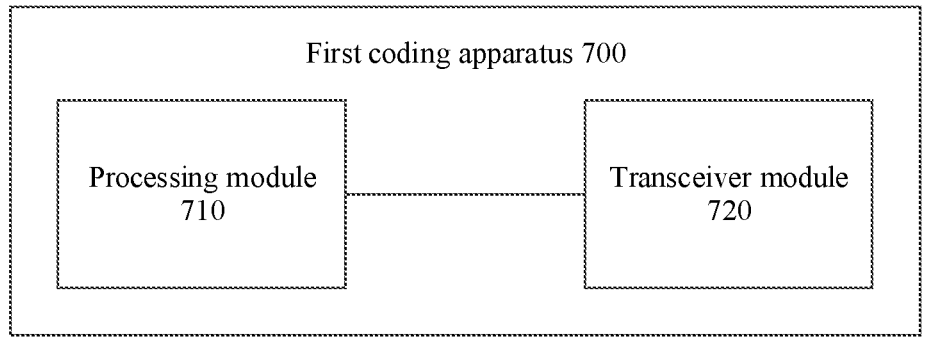
FIG. 7 is a schematic block diagram of a coding apparatus according to an embodiment of this disclosure.

With reference to the accompanying drawings, the following describes apparatuses for implementing the foregoing methods in embodiments of this application. Therefore, all the foregoing content may be used in the following embodiments. Repeated content is not described again. FIG. 7 is a schematic block diagram of a first coding apparatus 700 according to an embodiment of this application.

The first coding apparatus 700 includes a processing module 710 and a transceiver module 720. For example, the first coding apparatus 700 may be a network device, a chip used in the network device, or another combined device or a component that has functions of the network device. The first coding apparatus 700 may be a terminal device, a chip used in the terminal device, or another combined device or a component that has functions of the terminal device. When the first coding apparatus 700 is the network device, the transceiver module 720 may be a transceiver. The transceiver may include an antenna, a radio frequency circuit, and the like. The processing module 710 may be a processor, for example, a baseband processor, and the baseband processor may include one or more central processing units (CPU). When the first coding apparatus 700 is the component that has the functions of the terminal device, the transceiver module 720 may be a radio frequency unit, and the processing module 710 may be a processor, for example, a baseband processor. When the first coding apparatus 700 is a chip system, the transceiver module 720 may be an input/output interface of a chip (for example, a baseband chip), and the processing module 710 may be a processor of the chip system, and may include one or more central processing units. It should be understood that the processing module 710 in this embodiment of this application may be implemented by a processor or a processor-related circuit component, and the transceiver module 720 may be implemented by a transceiver or a transceiver-related circuit component.

For example, the processing module 710 may be configured to perform all operations other than sending and receiving operations performed by the first module of the first coding apparatus in the embodiment shown in FIG. 4a, FIG. 5a, or FIG. 6a, for example, step 401 to step 404, and/or another process for supporting the technology described in this specification. The transceiver module 720 may be configured to perform all sending and receiving operations performed by the first module in the embodiment shown in FIG. 4a, FIG. 5a, or FIG. 6a, and/or configured to support another process of the technology described in this specification.

In addition, the transceiver module 720 may be a functional module. The functional module can implement both a sending operation and a receiving operation. For example, the transceiver module 720 may be configured to perform all sending and receiving operations performed by the first module in the embodiment shown in FIG. 4a, FIG. 5a, or FIG. 6a. For example, the transceiver module 720 is considered as a sending module in the case of performing the sending operation, and the transceiver module 720 is considered as a receiving module in the case of performing the receiving operation. Alternatively, the transceiver module 720 may be two functional modules. The transceiver module 720 may be a general term of the two functional modules: a sending module and a receiving module. The sending module is configured to implement the sending operation. For example, the sending module may be configured to perform all sending operations performed by the first module in the embodiment shown in FIG. 4a, FIG. 5a, or FIG. 6a. The receiving module is configured to implement a receiving operation. For example, the receiving module may be configured to perform all receiving operations performed by the first module in the embodiment shown in FIG. 4a, FIG. 5a, or FIG. 6a.

The processing module 710 is configured to determine a size of a to-be-coded data unit based on a size of a first data unit, code the to-be-coded data unit to obtain a coded data unit, generate the first data unit based on the coded data unit, and output the first data unit by using the transceiver module 720. The first data unit may be a transport block TB, a protocol data unit PDU, or a service data unit SDU.

In a possible implementation, the processing module 710 is configured to determine the size of the to-be-coded data unit based on the size of the first data unit and a quantity of to-be-coded data units.

In a possible implementation, the processing module 710 is configured to determine the size of the to-be-coded data unit based on the size of the first data unit and a quantity of coded data units.

In a possible implementation, the size of the to-be-coded data unit is further related to a header size of the coded data unit.

In a possible implementation, the size of the to-be-coded data unit satisfies:

$$\left\lceil \frac{S1}{\frac{M}{R}} \right\rceil - H, \text{ or } \left\lfloor \frac{S1}{M/R} \right\rfloor - H$$

S1 represents the size of the first data unit, M represents the quantity of to-be-coded data units, R represents a first coding bit rate, H represents the header size of the coded data unit, $\lfloor \cdot \rfloor$ represents rounding down, and $\lceil \cdot \rceil$ represents rounding up.

In a possible implementation, the processing module 710 is configured to obtain a second data unit by using the transceiver module 720, and generate the to-be-coded data unit based on the size of the to-be-coded data unit and the second data unit.

In a possible implementation, the processing module 710 is configured to receive first indication information by using the transceiver module 720, where the first indication information indicates the size of the first data unit.

In a possible implementation, the processing module 710 is configured to send second indication information by using the transceiver module 720. The second indication information indicates the quantity of coded data units, or indicates the quantity of to-be-coded data units and the first coding bit rate, or indicates the size of the to-be-coded data unit or a size of the coded data unit.

In a possible implementation, the to-be-coded data unit includes a to-be-coded newly transmitted data unit, and the coded data unit includes a coded newly transmitted data unit. The processing module 710 is configured to determine a size of the to-be-coded newly transmitted data unit based on a size of a first retransmitted data unit and the size of the first data unit, and code the to-be-coded newly transmitted data unit to obtain the coded newly transmitted data unit.

In a possible implementation, the processing module 710 is configured to determine the size of the to-be-coded newly transmitted data unit based on the size of the first data unit, the size of the first retransmitted data unit, and a quantity of to-be-coded newly transmitted data units.

In a possible implementation, the size of the to-be-coded newly transmitted data unit is determined based on the size of the first data unit, the size of the first retransmitted data unit, and a quantity of coded newly transmitted data units.

In a possible implementation, the size of the to-be-coded newly transmitted data unit is further related to a header size of the coded newly transmitted data unit.

In a possible implementation, the size of the to-be-coded newly transmitted data unit satisfies:

$$\left\lceil \frac{S1 - S2}{M1/R1} \right\rceil - H1, \text{ or } \left\lfloor \frac{S1 - S2}{M1/R1} \right\rfloor - H1$$

S1 represents the size of the first data unit, S2 represents the size of the first retransmitted data unit, M1 represents the quantity of to-be-coded newly transmitted data units, H1 represents the header size of the coded newly transmitted data unit, R1 represents a second coding bit rate, $\lfloor \cdot \rfloor$ represents rounding down, and $\lceil \cdot \rceil$ represents rounding up.

In a possible implementation, the processing module 710 is configured to obtain a fourth data unit by using the transceiver module 720, and determine the to-be-coded newly transmitted data unit based on the size of the to-be-coded newly transmitted data unit and the fourth data unit.

In a possible implementation, the to-be-coded newly transmitted data unit satisfies at least one of the following:
the size of the to-be-coded newly transmitted data unit satisfies a first condition, and the quantity of to-be-coded newly transmitted data units satisfies a second condition.

The first condition is that the size of the to-be-coded newly transmitted data unit is less than or equal to a first threshold; or the first condition is that the size of the to-be-coded newly transmitted data unit falls within a first value range.

The second condition is that the quantity of to-be-coded newly transmitted data units is less than or equal to a second threshold; or the second condition is that the quantity of to-be-coded newly transmitted data units falls within a second value range.

In a possible implementation, the coded newly transmitted data unit satisfies at least one of the following:
a size of the coded newly transmitted data unit satisfies a third condition, and the quantity of coded newly transmitted data units satisfies a fourth condition.

The third condition is that the size of the coded newly transmitted data unit is less than or equal to a third threshold; or the third condition is that the size of the coded newly transmitted data unit falls within a third value range.

The fourth condition is that the quantity of coded newly transmitted data units is less than or equal to a fourth threshold; or the fourth condition is that the quantity of coded newly transmitted data units falls within a fourth value range.

In a possible implementation, the to-be-coded data unit further includes a to-be-coded retransmitted data unit, and the coded data unit further includes a coded retransmitted data unit. The processing module 710 is configured to determine a size of the to-be-coded retransmitted data unit based on the size of the to-be-coded newly transmitted data unit, and code the to-be-coded retransmitted data unit to obtain the coded retransmitted data unit.

In another possible implementation, the processing module 710 is configured to code the to-be-coded newly transmitted data unit and the to-be-coded retransmitted data unit, to obtain the coded newly transmitted data unit and the coded retransmitted data unit.

In a possible implementation, the to-be-coded data unit further includes the to-be-coded retransmitted data unit, and the coded data unit further includes the coded retransmitted data unit. The processing module 710 is configured to code the to-be-coded retransmitted data unit to obtain a second retransmitted data unit, and generate the coded retransmitted data unit based on the size of the to-be-coded newly transmitted data unit and the second retransmitted data unit.

In a possible implementation, the processing module 710 is configured to send third indication information by using the transceiver module 720. The third indication information indicates the quantity of coded newly transmitted data units, or indicates the quantity of to-be-coded newly transmitted data units and a coding bit rate, or indicates the size of the to-be-coded newly transmitted data unit or the size of the coded newly transmitted data unit.

In a possible implementation, the processing module 710 is configured to send fourth indication information by using the transceiver module 720. The fourth indication information indicates a quantity of to-be-coded retransmitted data units and a coding bit rate, or the fourth indication information indicates a quantity of coded retransmitted data units, or the fourth indication information indicates the size of the to-be-coded retransmitted data unit or a size of the coded retransmitted data unit.

Embodiments of this disclosure further provide a coding apparatus. The coding apparatus may be a network device, a terminal device, or a circuit. The coding apparatus may be configured to perform actions performed by the first module in the foregoing method embodiment.

Figure 8:
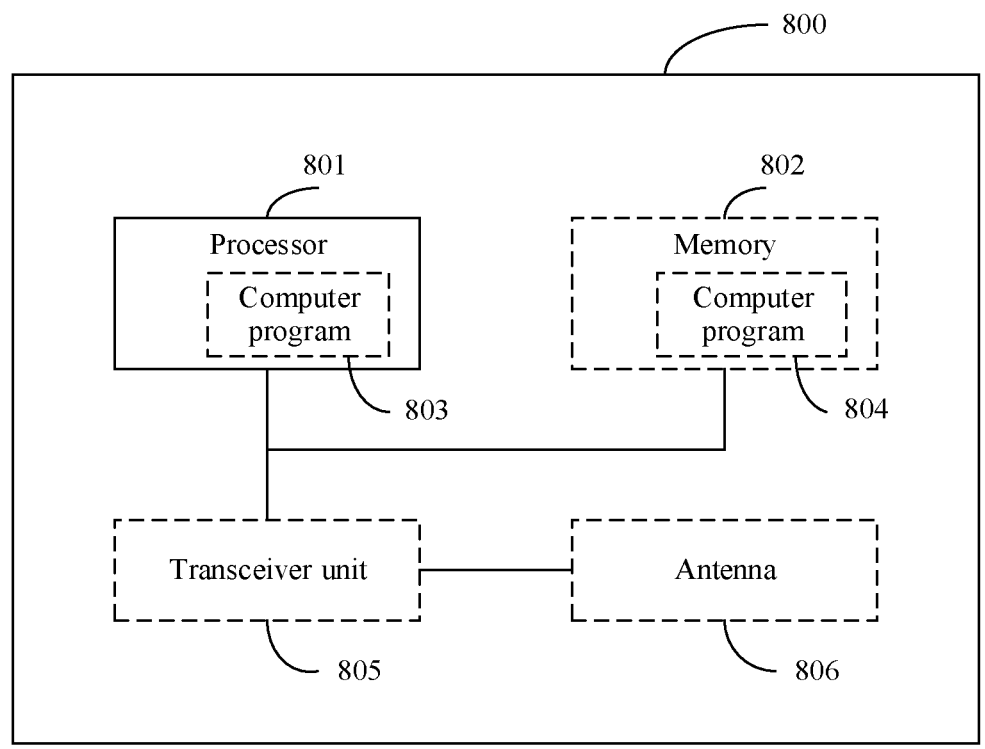
FIG. 8 is a schematic block diagram of a coding apparatus according to an embodiment of this disclosure.

Based on a same concept as the foregoing coding method, as shown in FIG. 8, embodiments of this application further provide a coding apparatus 800. The coding apparatus 800 may be configured to implement the method performed by the first module in the foregoing method embodiments. For details, refer to the descriptions in the foregoing method embodiments. The coding apparatus 800 may be a network device or a terminal device, or may be located in a network device or a terminal device, and may be a transmitting end device or a receiving end device.

The coding apparatus 800 includes one or more processors 801. The processor 801 may be a general-purpose processor, a dedicated processor, or the like. For example, the processor may be a baseband processor or a central processing unit. The baseband processor may be configured to process a communication protocol and communication data. The central processing unit may be configured to control the coding apparatus (for example, a network device, a terminal device, a vehicle-mounted device, or a chip), execute a software program, and process data of the software program. The coding apparatus 800 may include a transceiver unit, configured to input (receive) and output (send) signals. For example, the transceiver unit may be a transceiver, a radio frequency chip, or the like.

The coding apparatus 800 includes one or more processors 801, and the one or more processors 801 may implement the method performed by the first module in the foregoing embodiments.

Optionally, the processor 801 may further implement another function in addition to the methods in the foregoing embodiments. Optionally, in an implementation, the processor 801 may execute a computer program, so that the coding apparatus 800 performs the method performed by the first module in the foregoing method embodiments. All or a part of the computer program may be stored in the processor 801, for example, a computer program 803. Alternatively, all or a part of the computer program may be stored in a memory 802 coupled to the processor 801, for example, a computer program 804. Alternatively, the computer programs 803 and 804 may be used together to enable the coding apparatus 800 to perform the method performed by the first module in the foregoing method embodiments.

In another possible implementation, the coding apparatus 800 may alternatively include a circuit, and the circuit may implement functions performed by the first module in the foregoing method embodiments.

In still another possible implementation, the coding apparatus 800 may include one or more memories 802 storing a computer program 804. The computer program may be run on a processor, so that the coding apparatus 800 performs the coding method described in the foregoing method embodiments. Optionally, the memory may further store data. Optionally, the processor may also store a computer program and/or data. For example, the one or more memories 802 may store an association or a correspondence described in the foregoing embodiments, or a related parameter or table provided in the foregoing embodiments. The processor and the memory may be disposed separately, or may be integrated or coupled together.

In still another possible implementation, the coding apparatus 800 may further include a transceiver unit 805. The processor 801, which may be referred to as a processing unit, controls the coding apparatus (the first module or the second module of the first coding apparatus). The transceiver unit 805, which may be referred to as a transceiver, a transceiver circuit, or the like, is configured to receive and send data or control signaling.

For example, if the coding apparatus 800 is a chip used in a communication device or another combined device, component, or the like that has functions of the communication device, the coding apparatus 800 may include the transceiver unit 805.

In still another possible implementation, the coding apparatus 800 may further include the transceiver unit 805 and an antenna 806. The processor 801, which may be referred to as a processing unit, controls the coding apparatus (the first module or the second module of the first coding apparatus). The transceiver unit 805, which may be referred to as a transceiver, a transceiver circuit, or the like, is configured to implement a transceiver function of the apparatus by using the antenna 806.

The processor 801 is configured to determine a size of a to-be-coded data unit based on a size of a first data unit, code the to-be-coded data unit to obtain a coded data unit, generate the first data unit based on the coded data unit, and output the first data unit by using the transceiver unit 805. The first data unit is a TB, a PDU, or an SDU.

It should be noted that, the processor in this embodiment of this application may be an integrated circuit chip, and has a signal processing capability. In an implementation process, the steps in the foregoing method embodiments may be completed by using an integrated logic circuit of hardware in the processor, or a computer program in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this disclosure may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this disclosure may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the system and methods described in this specification aims to include but is not limited to these and any memory of another appropriate type.

Embodiments of this disclosure further provide a computer-readable storage medium storing a computer program. When the computer program is executed by a computer, the method in any one of the foregoing method embodiments applied to the first module is implemented.

Embodiments of this disclosure further provide a computer program product. When the computer program product is executed by a computer, the method in any one of the foregoing method embodiments applied to the first module is implemented.

All or some of the foregoing embodiments may be implemented by using software, hardware, firmware, or any combination thereof. When software implements the foregoing embodiments, all or some of the foregoing embodiments may be implemented in a form of a computer program product. The computer program product includes one or more computer programs. When the one or more computer programs are loaded and executed on a computer, the procedures or functions according to embodiments of this disclosure are entirely or partially generated. The computer may be a general-purpose computer, a dedicated computer, a computer network, or other programmable apparatuses. The computer program may be stored in a computer-readable storage medium or may be transmitted from a computer-readable storage medium to another computer-readable storage medium. For example, the computer program may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), or may be an optical medium (for example, a high-density digital video disc (DVD)), or may be a semiconductor medium (for example, a solid state disk (SSD)).

Embodiments of this application further provide a coding apparatus, including a processor and an interface. The processor is configured to perform the method in any one of the foregoing method embodiments applied to the first module.

It should be understood that the foregoing processing apparatus may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Embodiments of this disclosure further provide a computer-readable storage medium storing a computer program. When the computer program is executed by a computer, the computer may implement a procedure related to the first module in the embodiment shown in FIG. 4a, FIG. 5a, or FIG. 6a provided in the foregoing method embodiments.

Embodiments of this disclosure further provide a computer program product storing a computer program. When the computer program is executed by a computer, the computer may implement a related procedure in the embodiment shown in FIG. 4a, FIG. 5a, or FIG. 6a provided in the foregoing method embodiments.

It should be understood that the processor mentioned in embodiments of this disclosure may be a CPU, another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this disclosure may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an (EEPROM), or a flash memory. The transitory memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

When the processor is a general-purpose processor, a DSP, an ASIC, an FPGA, or another programmable logic device, discrete gate or transistor logic device, or discrete hardware component, the memory (a storage module) is integrated into the processor.

The memory described in this specification aims to include but is not limited to these and any memory of another appropriate type.

It should be understood that sequence numbers of the foregoing processes do not mean execution sequences in various embodiments of this disclosure. The execution sequences of the processes described above should be determined based on functions and internal logic of the processes, but should not be construed as any limitation on the implementation processes in embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for a particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed systems, apparatus, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this disclosure may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this disclosure essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing computer-readable storage medium may be any usable medium accessible by a computer. By way of example, and not limitation, the computer-readable medium may include a random access memory (RAM), a read-only memory (ROM), an electrically erasable programmable read-only memory (EE-PROM), a compact disc read-only memory (CD-ROM), a universal serial bus flash disk (USB flash disk), a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely specific implementations, but are not intended to limit the protection scope of embodiments of this disclosure. Any variation or replacement readily figured out by a person skilled in the art within the technical scope disclosed in embodiments of this disclosure shall fall within the protection scope of the claims.

What is claimed is:

1. A coding method, comprising:
    coding a to-be-coded data unit to obtain a coded data unit, a size of the to-be-coded data unit being related to a size of a first data unit, the first data unit being one of a transport block (TB), a protocol data unit (PDU), or a service data unit (SDU), wherein the size of the to-be-coded data unit satisfies the following relationship:

$$\left\lceil \frac{S1}{\frac{M}{R}} \right\rceil - H, \text{ or } \left\lfloor \frac{S1}{M/R} \right\rfloor - H$$

wherein S1 represents the size of the first data unit, M represents a quantity of to-be-coded data units, R represents a first coding bit rate, H represents a header size of the coded data unit, $\lfloor \cdot \rfloor$ represents rounding down, and $\lceil \cdot \rceil$ represents rounding up;
generating the first data unit based on the coded data unit; and
outputting the first data unit.

2. The method according to claim 1, further comprising:
sending second indication information indicating one of the following: a quantity of coded data units, the quantity of to-be-coded data units and the first coding bit rate, the size of the to-be-coded data unit, or a size of the coded data unit.

3. The method according to claim 1, wherein the to-be-coded data unit comprises a to-be-coded newly transmitted data unit, the coded data unit comprises a coded newly transmitted data unit; and
the coding the to-be-coded data unit to obtain the coded data unit comprises:
    coding the to-be-coded newly transmitted data unit to obtain the coded newly transmitted data unit, a size of the to-be-coded newly transmitted data unit being related to a size of a first retransmitted data unit.

4. The method according to claim 3, the size of the to-be-coded newly transmitted data unit satisfying the following relationship:

$$\left\lceil \frac{S1-S2}{M1/R1} \right\rceil - H1, \text{ or } \left\lfloor \frac{S1-S2}{M1/R1} \right\rfloor - H1$$

wherein S1 represents the size of the first data unit, S2 represents the size of the first retransmitted data unit, M1 represents a quantity of to-be-coded newly transmitted data units, H1 represents a header size of the coded newly transmitted data unit, R1 represents a second coding bit rate, $\lfloor \cdot \rfloor$ represents rounding down, and $\lceil \cdot \rceil$ represents rounding up.

5. The method according to claim 3, the to-be-coded data unit further comprising a to-be-coded retransmitted data unit, and the coded data unit further comprising a coded retransmitted data unit, a size of the to-be-coded retransmitted data unit being related to the size of the to-be-coded newly transmitted data unit; and
the coding the to-be-coded data unit to obtain the coded data unit comprises:
    coding the to-be-coded retransmitted data unit to obtain the coded retransmitted data unit; or
    coding the to-be-coded newly transmitted data unit and the to-be-coded retransmitted data unit to obtain the coded newly transmitted data unit and the coded retransmitted data unit.

6. The method according to claim 3, the method further comprising: sending third indication information indicating one of: a quantity of coded newly transmitted data units, a quantity of to-be-coded newly transmitted data units and a coding bit rate, the size of the to-be-coded newly transmitted data unit, or a size of the coded newly transmitted data unit.

7. An apparatus, comprising:
    one or more processors; and
    a memory storing instructions that, when executed by the one or more processors, causes the apparatus to:
        code a to-be-coded data unit to obtain a coded data unit, a size of the to-be-coded data unit being related to a size of a first data unit, the first data unit being one of a transport block (TB), a protocol data unit (PDU), or a service data unit (SDU), wherein the size of the to-be-coded data unit satisfies the following relationship:

$$\left\lceil \frac{S1}{\frac{M}{R}} \right\rceil - H, \text{ or } \left\lfloor \frac{S1}{M/R} \right\rfloor - H$$

wherein S1 represents the size of the first data unit, M represents a quantity of to-be-coded data units, R represents a first coding bit rate, H represents a header size of the coded data unit, $\lfloor \cdot \rfloor$ represents rounding down, and $\lceil \cdot \rceil$ represents rounding up;
generate the first data unit based on the coded data unit; and
output the first data unit.

8. The apparatus according to claim 7, execution of the instructions by the one or more processors causing the apparatus to:
send second indication information indicating one of the following: a quantity of coded data units, the quantity of to-be-coded data units and the first coding bit rate, the size of the to-be-coded data unit, or a size of the coded data unit.

9. The apparatus according to claim 7, the to-be-coded data unit comprising a to-be-coded newly transmitted data unit, and the coded data unit further comprising a coded newly transmitted data unit; and
coding the to-be-coded data unit to obtain the coded data unit comprises:
coding the to-be-coded newly transmitted data unit to obtain the coded newly transmitted data unit, a size of the to-be-coded newly transmitted data unit being related to a size of a first retransmitted data unit.

10. The apparatus according to claim 9, the size of the to-be-coded newly transmitted data unit satisfying the following relationship:

$$\left\lceil \frac{S1 - S2}{M1/R1} \right\rceil - H1, \text{ or } \left\lfloor \frac{S1 - S2}{M1/R1} \right\rfloor - H1$$

wherein S1 represents the size of the first data unit, S2 represents the size of the first retransmitted data unit, M1 represents a quantity of to-be-coded newly transmitted data units, H1 represents a header size of the coded newly transmitted data unit, R1 represents a second coding bit rate, $\lfloor \cdot \rfloor$ represents rounding down, and $\lceil \cdot \rceil$ represents rounding up.

11. The apparatus according to claim 9, the to-be-coded data unit further comprising a to-be-coded retransmitted data unit, and the coded data unit further comprising a coded retransmitted data unit, a size of the to-be-coded retransmitted data unit being related to the size of the to-be-coded newly transmitted data unit; and
coding the to-be-coded data unit to obtain the coded data unit comprises:
coding the to-be-coded retransmitted data unit to obtain the coded retransmitted data unit; or
coding the to-be-coded newly transmitted data unit and the to-be-coded retransmitted data unit to obtain the coded newly transmitted data unit and the coded retransmitted data unit.

12. The apparatus according to claim 9, execution of the instructions by the one or more processors causing the apparatus to:
send third indication information indicating one of the following: a quantity of coded newly transmitted data units, a quantity of to-be-coded newly transmitted data units and a coding bit rate, the size of the to-be-coded newly transmitted data unit, or a size of the coded newly transmitted data unit.

13. A non-transitory computer readable medium, storing instructions that, when executed by a computer, cause the computer to:
code a to-be-coded data unit to obtain a coded data unit, a size of the to-be-coded data unit being related to a size of a first data unit, the first data unit being one of a transport block (TB), a protocol data unit (PDU), or a service data unit (SDU), wherein the size of the to-be-coded data unit satisfies the following relationship:

$$\left\lceil \frac{S1}{\frac{M}{R}} \right\rceil - H, \text{ or } \left\lfloor \frac{S1}{M/R} \right\rfloor - H$$

wherein S1 represents the size of the first data unit, M represents a quantity of to-be-coded data units, R represents a first coding bit rate, H represents a header size of the coded data unit, $\lfloor \cdot \rfloor$ represents rounding down, and $\lceil \cdot \rceil$ represents rounding up;
generate the first data unit based on the coded data unit; and
outputting the first data unit.

14. The non-transitory computer readable medium according to claim 13, the instructions further causing the computer to:
send second indication information indicating one of: a quantity of coded data units, the quantity of to-be-coded data units and the first coding bit rate, the size of the to-be-coded data unit, or a size of the coded data unit.

15. The non-transitory computer readable medium according to claim 13, the to-be-coded data unit comprising a to-be-coded newly transmitted data unit and the coded data unit comprising a coded newly transmitted data unit; and
coding the to-be-coded data unit to obtain the coded data unit comprises:
coding the to-be-coded newly transmitted data unit to obtain the coded newly transmitted data unit, a size of the to-be-coded newly transmitted data unit being related to a size of a first retransmitted data unit.

16. The non-transitory computer readable medium according to claim 15, the size of the to-be-coded newly transmitted data unit satisfying the following relationship:

$$\left\lceil \frac{S1 - S2}{M1/R1} \right\rceil - H1, \text{ or } \left\lfloor \frac{S1 - S2}{M1/R1} \right\rfloor - H1$$

wherein S1 represents the size of the first data unit, S2 represents the size of the first retransmitted data unit, M1 represents a quantity of to-be-coded newly transmitted data units, H1 represents a header size of the coded newly transmitted data unit, R1 represents a second coding bit rate, $\lfloor \cdot \rfloor$ represents rounding down, and $\lceil \cdot \rceil$ represents rounding up.

17. The non-transitory computer readable medium according to claim 15, the instructions, when executed by the computer, cause the computer to:
send third indication information indicating one of: a quantity of coded newly transmitted data units, a quantity of to-be-coded newly transmitted data units and a coding bit rate, the size of the to-be-coded newly transmitted data unit, or a size of the coded newly transmitted data unit.

* * * * *